US009235955B2

(12) United States Patent
Morrow et al.

(10) Patent No.: US 9,235,955 B2
(45) Date of Patent: Jan. 12, 2016

(54) UNIVERSAL GAME MONITORING UNIT AND SYSTEM

(75) Inventors: James W. Morrow, Sparks, NV (US); Lawrence McAllister, Las Vegas, NJ (US); Marvin A. Hein, Las Vegas, NY (US); Warren R. White, Las Vegas, NV (US); Robert A. Luciano, Jr., Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 2180 days.

(21) Appl. No.: 11/456,541

(22) Filed: Jul. 10, 2006

(65) Prior Publication Data

US 2011/0230260 A1 Sep. 22, 2011

Related U.S. Application Data

(63) Continuation-in-part of application No. 10/943,771, filed on Sep. 16, 2004, now Pat. No. 7,950,999, and a continuation-in-part of application No. 09/746,854, filed on Dec. 22, 2000, now abandoned.

(60) Provisional application No. 60/714,754, filed on Sep. 7, 2005.

(51) Int. Cl.
*A63F 13/25* (2014.01)
*G07F 17/32* (2006.01)

(52) U.S. Cl.
CPC ............ *G07F 17/3232* (2013.01); *G07F 17/32* (2013.01); *G07F 17/3234* (2013.01)

(58) Field of Classification Search
CPC . G07F 17/32; G07F 17/3232; G07F 17/3234; G07F 17/3211
USPC .................. 463/40–42, 16, 20, 30–33, 25, 29
See application file for complete search history.

(56) References Cited

U.S. PATENT DOCUMENTS 3,662,105 A 5/1972 Hurst et al.
4,448,419 A 5/1984 Telnaes (Continued)

FOREIGN PATENT DOCUMENTS

AU 704691 4/1997
EP 0769769 4/1997

(Continued)

*Primary Examiner* — Ronald Laneau
*Assistant Examiner* — Ross Williams
(74) *Attorney, Agent, or Firm* — Brooke W. Quist; Marvin A. Hein; Philip J. Anderson

(57) ABSTRACT

An embedded user interface incorporated into a gaming device, the gaming device including a gaming presentation of a base game and a gaming processor for controlling the base game. The embedded user interface includes: a player tracking interface and an embedded processor. The player tracking interface includes (or is associated with) a display screen and enables display of a system game to a user, presentation of information to the user, and reception of information from the user. The embedded processor employs an internal operating system and communicates with the gaming processor, enables control of the system game, control of player tracking information, and control of non-gaming information. In one embodiment, the embedded user interface enables control of a system game of which at least a portion of the system game is presented physically external to the embedded user interface. In another embodiment, the embedded user interface enables control of a system gaming indicator that is physically external to the embedded user interface. In still another embodiment, communication between a game processor and an embedded user interface is only enabled through the gaming network and is not direct enabled via a direct connection.

25 Claims, 19 Drawing Sheets

(56) References Cited

U.S. PATENT DOCUMENTS

| | | | |
|---|---|---|---|
| 4,455,025 | A | 6/1984 | Itkis |
| 4,676,506 | A | 6/1987 | Crouch |
| 4,718,672 | A | 1/1988 | Okada |
| 4,837,728 | A | 6/1989 | Barrie et al. |
| 4,856,787 | A | 8/1989 | Itkis |
| 4,884,287 | A | 11/1989 | Jones et al. |
| 5,025,412 | A | 6/1991 | Dalrymple et al. |
| 5,429,361 | A | 7/1995 | Raven et al. |
| 5,455,950 | A | 10/1995 | Vasseur et al. |
| 5,655,961 | A | 8/1997 | Acres et al. |
| 5,675,813 | A | 10/1997 | Holmdahl |
| 5,702,304 | A | 12/1997 | Acres et al. |
| 5,741,183 | A | 4/1998 | Acres et al. |
| 5,752,008 | A | 5/1998 | Bowling |
| 5,752,882 | A | 5/1998 | Acres et al. |
| 5,759,102 | A | 6/1998 | Pease et al. |
| 5,767,844 | A | 6/1998 | Stoye |
| 5,768,550 | A | 6/1998 | Dean et al. |
| 5,769,716 | A | 6/1998 | Saffari et al. |
| 5,770,533 | A | 6/1998 | Franchi |
| 5,779,545 | A | 7/1998 | Berg et al. |
| 5,796,389 | A | 8/1998 | Bertram et al. |
| 5,809,482 | A | 9/1998 | Strisower |
| 5,816,918 | A | 10/1998 | Kelly et al. |
| 5,818,948 | A | 10/1998 | Gulick |
| 5,820,459 | A | 10/1998 | Acres et al. |
| 5,833,536 | A | 11/1998 | Davids et al. |
| 5,833,540 | A | 11/1998 | Miodunski et al. |
| 5,835,791 | A | 11/1998 | Goff et al. |
| 5,836,817 | A | 11/1998 | Acres et al. |
| 5,841,996 | A | 11/1998 | Nolan et al. |
| 5,851,148 | A | 12/1998 | Brune et al. |
| 5,870,572 | A | 2/1999 | Garcia |
| 5,876,284 | A | 3/1999 | Acres et al. |
| 5,885,158 | A | 3/1999 | Torango et al. |
| 5,890,015 | A | 3/1999 | Garney et al. |
| 5,903,777 | A | 5/1999 | Brief |
| 5,918,073 | A | 6/1999 | Hewitt |
| 5,919,091 | A | 7/1999 | Bell et al. |
| 5,928,347 | A | 7/1999 | Jones |
| 5,933,656 | A | 8/1999 | Hansen |
| 5,935,224 | A | 8/1999 | Svancarek et al. |
| 5,938,740 | A | 8/1999 | Chang |
| 5,967,896 | A | 10/1999 | Jorasch et al. |
| 5,973,696 | A | 10/1999 | Agranat et al. |
| 5,984,779 | A | 11/1999 | Bridgeman et al. |
| 6,008,784 | A | 12/1999 | Acres et al. |
| 6,010,404 | A | 1/2000 | Walker et al. |
| 6,068,552 | A | 5/2000 | Walker et al. |
| 6,071,190 | A | 6/2000 | Weiss et al. |
| 6,077,163 | A | 6/2000 | Walker et al. |
| 6,110,041 | A | 8/2000 | Walker et al. |
| 6,113,495 | A | 9/2000 | Walker et al. |
| 6,128,673 | A | 10/2000 | Aronson et al. |
| 6,135,884 | A | 10/2000 | Hedrick et al. |
| 6,162,122 | A | 12/2000 | Acres et al. |
| 6,195,690 | B1 | 2/2001 | Weinreb |
| 6,217,448 | B1 | 4/2001 | Olsen |
| 6,226,700 | B1 | 5/2001 | Wandler et al. |
| 6,244,958 | B1 | 6/2001 | Acres |
| 6,254,483 | B1 | 7/2001 | Acres |
| 6,257,981 | B1 | 7/2001 | Acres et al. |
| 6,259,781 | B1 | 7/2001 | Crouch et al. |
| 6,267,675 | B1 | 7/2001 | Lee |
| 6,280,328 | B1 | 8/2001 | Holch et al. |
| 6,301,634 | B1 | 10/2001 | Gomi et al. |
| 6,302,790 | B1 | 10/2001 | Brossard |
| 6,312,333 | B1 | 11/2001 | Acres |
| 6,315,666 | B1 | 11/2001 | Mastera et al. |
| 6,319,125 | B1 | 11/2001 | Acres |
| 6,332,099 | B1 | 12/2001 | Heidel et al. |
| 6,334,160 | B1 | 12/2001 | Emmert et al. |
| 6,339,424 | B1 | 1/2002 | Ishikawa et al. |
| 6,364,768 | B1 | 4/2002 | Acres et al. |
| 6,364,769 | B1 | 4/2002 | Weiss et al. |
| 6,371,852 | B1 | 4/2002 | Acres |
| 6,375,567 | B1 | 4/2002 | Acres |
| 6,375,569 | B1 | 4/2002 | Acres |
| 6,405,254 | B1 | 6/2002 | Hadland |
| 6,427,179 | B1 | 7/2002 | Amrany et al. |
| 6,431,983 | B2 | 8/2002 | Acres |
| 6,434,644 | B1 | 8/2002 | Young et al. |
| 6,457,099 | B1 | 9/2002 | Gilbert |
| RE37,885 | E | 10/2002 | Acres et al. |
| 6,494,776 | B1 | 12/2002 | Molbak |
| 6,524,230 | B1 | 2/2003 | Harding et al. |
| 6,553,439 | B1 | 4/2003 | Greger et al. |
| 6,565,434 | B1 | 5/2003 | Acres |
| 6,607,441 | B1 | 8/2003 | Acres |
| 6,652,378 | B2 | 11/2003 | Cannon et al. |
| 6,671,763 | B1 | 12/2003 | Korowitz et al. |
| 6,675,226 | B1 | 1/2004 | Nair et al. |
| 6,697,892 | B1 | 2/2004 | Laity et al. |
| 6,712,697 | B2 | 3/2004 | Acres |
| 6,712,698 | B2 * | 3/2004 | Paulsen et al. .................. 463/30 |
| 6,722,985 | B2 | 4/2004 | Criss-Puszkiewicz |
| 6,722,986 | B1 | 4/2004 | Lyons et al. |
| 6,800,030 | B2 | 10/2004 | Acres |
| 6,805,634 | B1 | 10/2004 | Wells et al. |
| 6,832,958 | B2 | 12/2004 | Acres et al. |
| 6,908,391 | B2 | 6/2005 | Gatto et al. |
| 6,910,964 | B2 | 6/2005 | Acres |
| 6,916,247 | B2 | 7/2005 | Gatto et al. |
| RE38,812 | E | 10/2005 | Acres et al. |
| 7,007,278 | B2 | 2/2006 | Gungabeesoon ............. 719/311 |
| 7,043,641 | B1 | 5/2006 | Martinek et al. |
| 7,093,040 | B1 | 8/2006 | Mach |
| D531,333 | S | 10/2006 | Acres et al. |
| 7,124,413 | B1 | 10/2006 | Klemm et al. ................ 719/313 |
| 7,290,072 | B2 | 10/2007 | Quraishi et al. .............. 710/105 |
| 7,758,423 | B2 | 7/2010 | Foster et al. .................... 463/31 |
| 2001/0005367 | A1 | 6/2001 | Liu et al. |
| 2002/0016206 | A1 | 2/2002 | Yoshimi et al. |
| 2002/0019891 | A1 | 2/2002 | Morrow et al. |
| 2002/0025852 | A1 | 2/2002 | Alcorn et al. |
| 2002/0065136 | A1 | 5/2002 | Day ................................ 463/42 |
| 2002/0111206 | A1 | 8/2002 | Van Baltz et al. |
| 2002/0183105 | A1 | 12/2002 | Cannon et al. |
| 2003/0014659 | A1 | 1/2003 | Zhu .............................. 713/200 |
| 2003/0032474 | A1 * | 2/2003 | Kaminkow ..................... 463/25 |
| 2003/0054878 | A1 | 3/2003 | Benoy et al. |
| 2003/0054881 | A1 * | 3/2003 | Hedrick et al. ................. 463/29 |
| 2003/0060247 | A1 | 3/2003 | Goldberg et al. |
| 2003/0100372 | A1 | 5/2003 | Gatto et al. |
| 2004/0002378 | A1 | 1/2004 | Acres et al. |
| 2004/0002383 | A1 | 1/2004 | Lundy et al. |
| 2004/0100490 | A1 | 5/2004 | Boston et al. |
| 2004/0142750 | A1 | 7/2004 | Glisson et al. |
| 2004/0214622 | A1 | 10/2004 | Atkinson |
| 2005/0026670 | A1 * | 2/2005 | Lardie ............................ 463/16 |
| 2005/0141509 | A1 | 6/2005 | Rabie et al. |
| 2005/0153768 | A1 | 7/2005 | Paulsen ........................... 463/16 |
| 2005/0255911 | A1 | 11/2005 | Nguyen et al. |
| 2006/0217172 | A1 | 9/2006 | Roireau .......................... 463/16 |
| 2007/0259709 | A1 | 11/2007 | Kelly et al. |

FOREIGN PATENT DOCUMENTS

| | | |
|---|---|---|
| EP | 1298605 | 4/2003 |
| WO | WO 2004024260 | 3/2004 |
| WO | 2005027062 | 3/2005 |
| WO | 2006033930 | 3/2006 |
| WO | 2006033986 | 3/2006 |
| WO | 2006039366 | 4/2006 |

* cited by examiner

UNIVERSAL GAME MONITORING UNIT AND SYSTEM

CROSS-REFERENCE TO RELATED APPLICATIONS

This application is a continuation-in-part of U.S. patent application Ser. No. 10/943,771 filed Sep. 16, 2004, entitled USER INTERFACE SYSTEM AND METHOD FOR A GAMING MACHINE, which is hereby incorporated herein by reference. This application is also a continuation-in-part of U.S. patent application Ser. No. 09/746,854 filed Dec. 22, 2000, entitled GENERIC DEVICE CONTROLLER UNIT AND METHOD, which is hereby incorporated herein by reference. This application claims priority to U.S. Provisional Patent Application Ser. No. 60/714,754 filed Sep. 7, 2005, entitled SYSTEM GAMING APPARATUS AND METHOD, which is hereby incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates generally to a gaming system, and more particularly, to a system and methodology that integrates an embedded user interface into a gaming machine.

BACKGROUND OF THE INVENTION

For some time now, there has been a growing need to be able to inexpensively and easily connect a number of arbitrary devices to a computer running a standard operating system such as Microsoft® WINDOWS®. However, connecting devices to a computer running such a complicated operating system presents at least two vexing problems to the system designer.

The first problem involves the matter of physical interconnection, that is, some type of custom device is to be plugged into the computer. General purpose "IBM-compatible" computers have become more and more powerful and less and less expensive with every passing month, but that market is driven by a handful of more or less universal needs, such as a printer, a monitor, a keyboard, a mouse, a modem, and a hard disk. The modem hardware platform is optimized for accommodating these elements.

Meanwhile, the addition of custom equipment generally has meant either building an expansion board designed to specifically interface to that equipment, or buying a general purpose board that could be adapted to that purpose. The least expensive of these options is to add an expansion board by building or buying an industry-standard architecture (ISA) board. However, as time goes on, modem central processing unit (CPU) boards are being built with fewer and fewer ISA slots. Many central processing unit boards these days have only one ISA slot. This forces designers to have to develop much more complicated and expensive Peripheral Component Interface (PCI) boards. A PCI bus provides a high-bandwidth data channel between system board components, such as the CPU, and devices, such as hard disks and video adapters. Another problem experienced today is that most central processing unit boards have a limited number of corn ports. This creates a limitation in the number of devices that can be utilized.

The second problem facing the system designer that wants to incorporate custom hardware into a WINDOWS® environment is the issue of software development. Operating systems, by definition, are in charge of resource management. To that end, operating systems regard any and all hardware attached to the system as belonging to the operating system. As a result, user access to that hardware is supposed to be mediated by the operating system.

WINDOWS® NT, for example, being a secure operating system environment, rigorously enforces that rule. Accordingly, the result of user access to hardware being mediated by the NT operating system is that any effort by an application to access hardware directly is intercepted and disabled by the operating system. Hence, access to hardware can only be achieved through device drivers which are assumed to be trustworthy because they are loaded into the operating system at boot time.

Moreover, device driver programming is one of the most difficult software development paradigms in existence. Programming mistakes tend to make the computer crash, often without any indication of what went wrong. Debugging tools are primitive and difficult to use, and are limited in the information they convey. Each compile load-test cycle requires that the target machine be shut down and rebooted, which can take several minutes. Thus, the debugging process is often slow and discouraging work. In addition, many designers avoid performing WINDOWS® driver development. As a result, it is desirable to remove the need for developers to have to perform such work.

Another major problem experienced when connecting a number of arbitrary devices to a computer running a standard operating system, again, such as Microsoft® WINDOWS®, is the issue of real time device control. Essentially, true real time depends upon the application. A standard WINDOWS® environment, such as WINDOWS® 98 or WINDOWS® 2000, does not actually have true real time device control requirements for resource management by the operating system. The operating system simply performs the ordered functions as soon as it is able, which is usually in a sub-200 millisecond time frame. This time frame is small enough that most people equate this response time to be "real time," but in actuality it is not "true real time."

However, many peripheral devices actually have true real time device control requirements that are more precise than the above-stated time interval. For example, loaves of bread may be traveling down a conveyer belt at a given number of miles per hour. These loaves of bread have to be sprayed by a butter sprayer at precise time intervals as the loaves of bread pass the sprayer. If these true real time device control requirements are not maintained, the butter sprayer will miss the loaves of bread as they pass by the sprayer. Unfortunately, previous attempts to make the standard WINDOWS® operating systems function with true real time device control (such as with layered real time systems or real time kernels), have proved to be undesirably expensive, complicated, and inflexible, requiring more corn ports to be added. Further, these ports are slow (typically 9600 baud) and do not address the need to mix high speed data (video) and low speed data (mouse clicks) communications.

Traditionally, gaming machines have been designed for gaming purposes only. In this regard, gaming machines have been constructed only to include gaming functionality. Recently, however, casino owners have become aware that by adding additional features to gaming machines, they may be able to maintain a player's attention to the gaming machines for longer periods of time. This, in turn, leads to the player wagering at the gaming machine for longer periods of time, thereby increasing casino profits.

One technique that has been employed to maintain a player's attention at the gaming machine has been to provide players with access to gambling-related information. By attaching a small electronic display to the gaming device, gambling-related information, as well as news and advertisements can be sent to the player. The gambling-related information may include, for example, information on sports betting and betting options for those sporting events. Additionally, the gambling-related information may also include information such as horse racing and off-track betting. News and advertisements can also maintain a player's attention by providing the player with access to information ranging from show times, to restaurant and hotel specials, and to world events, thus reducing the need and/or desire for the player to leave the gaming machine.

Moreover, it would be desirable to provide the player with interactive access to the above information. This type of interactivity would allow players significantly more flexibility to make use of the above-described information. The gambling-related information could also be utilized by the player in a much more efficient manner. In this regard, greater levels of flexibility and access are likely to make a player remain and gamble at the gaming machine for significantly longer periods of time. Unfortunately, the system components that are currently utilized for displaying and accessing this type of information, such as external keypads and display modules, are extremely limited in the functionality and capabilities that they provide, thus limiting the success of their ability to maintain a player's attention.

As stated above, attempts to distribute gaming-related information and advertisements to players, has typically required additional system components to be attached to the gaming devices separately and apart from the construction of the gaming machine itself. Specifically, these components for accessing and displaying information from gaming machines have been extremely limited in their usefulness because of the lack of capabilities inherent in these components. Such components have generally included a keypad, card reader, and display equipment, such as a 2-line LED display. It would be desirable for these components to be integrated into the gaming device itself, in a more unified fashion to provide substantially greater functionality than that which has been previously available.

Furthermore, the collection data of gaming-related information and the playing habits of individual players can be of significant marketing value to the operators of the gaming devices. This information enables gaming operators to more effectively focus their marketing efforts on customers, through direct mail, contact in the gaming premise, organization of special events targeting better customers, and an array of techniques that are well known to individuals who practice the marketing craft in gaming environments.

Marketing experts typically like to have a wide range of information available regarding the aggregate play habits of customers, as well as the specific habits of each customer. The types of data desired for such marketing purposes include the frequency of play, the duration of play, the amount of money wagered, the amount won, and the types of games played. The collection of such data is accomplished most commonly by the use of "player tracking systems." These computer systems typically identify players through the use of a magnetic stripe card (i.e., a player tracking card) that a player inserts into a card reader attached to the gaming device before beginning play. In such a system, gaming devices are typically fitted with player tracking components that include a magnetic stripe card reader, a display device, and generally several buttons that provide players with at least some ability to communicate with the player tracking system.

In some systems, a microprocessor (or computer) is located in the gaming device that controls the player tracking devices. An additional responsibility of this microprocessor is to communicate with the gaming machine itself to monitor the play that is occurring. In this manner, the player tracking system identifies the player who is playing by reading the player's magnetically encoded card. The player tracking system is also aware of the game play activity on the gaming machine that the player is playing. The player tracking system computer typically collects all game play data from a network of gaming machines and accumulates it into a large data store in a database system. The accumulation of game play data in the database enables many types of analysis, as well as the formulation of marketing and sales strategies to improve the business operation of the gaming operator.

An occurrence that assists data collection is that several common communication protocols have emerged that enable ready communication between gaming devices and player tracking systems. Many protocols are well known and are used by a variety of player tracking system suppliers. These protocols are typically available in gaming devices that are installed in gaming venues, especially traditional domestic casinos, and make implementation of player tracking systems a reasonably straight-forward process.

Sometimes however, problems occur in gaming devices that are not produced primarily for traditional domestic casino use. This may happen for any of a wide variety of reasons. One example of such a potentially problematic system is a "video lottery." A video lottery system is a network that interconnects machines in a variety of physical locations. The controlling computer system collects accounting data from gaming machines in the network and has various other control and monitoring functions. Generally, in such a system, the gaming devices are interconnected to a wide area network and use different software structures and communication mechanisms than those found in mainstream casino based systems. They are often not configured to support communications to traditional player tracking systems. In particular, they may not support or be configured with appropriate protocols. Furthermore, they may not be approved by the appropriate regulatory bodies.

In this regard, the diversity of games and manufacturers, as well as the cost of regulatory approvals, makes the addition of player tracking capabilities a very time-consuming and expensive process. It is further complicated by the need to coordinate software and installation among what may be a large diversity of manufacturers, each potentially having differing priorities, capabilities, and motivations. Indeed, the costs associated with such player tracking systems can offset the benefits of installing a player tracking system. The problem extends past video lotteries to many types of non-traditional systems, including Bingo-based games (Indian Gaming Regulatory Act Class 2), European "street machines" (also known as Amusement With Prizes), and various types of international systems.

Player tracking systems have also long been relegated to small displays and fairly generic sound capabilities. Additionally, a wider variety of output (and potentially input) devices are also desirable. Furthermore, promotional and/or system-based games are new and have thus far been limited to video presentations on fairly small screens.

Accordingly, those skilled in the art have recognized the need for a device controller that has overcome the previous difficulties associated with physical interconnections between hardware, software, and operating systems; software development issues; and promotional game and system game device control.

SUMMARY OF THE INVENTION

In accordance with embodiment, an embedded user interface system associated with a gaming machine, wherein the gaming machine includes a gaming screen and a gaming processor. More particularly, the embedded user interface system includes a web content capable display screen, an embedded processor, and a dictionary extension. The web content capable display screen presents information to a user via the display screen. The embedded processor utilizes an internal operating system. The dictionary extension receives an incoming text string, parses the text string to identify a navigation command and pull a uniform resource locator from the text string, loads the uniform resource locator pulled from the text string into a variable, and indirectly navigates the web content capable display screen to the uniform resource locator in the variable. In this manner, the web content capable display screen increases user excitement by providing a richer gaming experience.

In accordance with another aspect of a preferred embodiment, the incoming data received by the embedded additional user interface are $I^2C$ messages (or other serial communications). Preferably, the embedded processor communicates with the gaming processor, and/or other connected devices, over an $I^2C$ bus (or other serial communications bus). The web content capable display screen of the embedded additional user interface is preferably a color graphic touch screen display. Preferably, the embedded processor is at least a 32-bit processor. Further, the internal operating system of an embedded additional user interface is preferably customized to match the specific hardware to which the internal operating system attaches.

In accordance with another aspect of a preferred embodiment, the embedded processor utilizes cryptographic technology. In one preferred embodiment, a certification process is offered for authentication and non-repudiation of the web content. Preferably, the certification process provides auditability and traceability. Specifically, the certification process provides sufficient security for gaming regulators to allow casino operators to design their own content.

In accordance with another aspect of a preferred embodiment, HTML is the web protocol into which the incoming data is translated in the embedded additional user interface. In another preferred embodiment, DHTML is the web protocol into which the incoming data is translated in the embedded additional user interface. In still another preferred embodiment, XML is the web protocol into which the incoming data is translated in the embedded additional user interface. In yet another preferred embodiment, MACROMEDIA FLASH animation technology is the web protocol into which the incoming data is translated in the embedded additional user interface. In one preferred embodiment, the embedded additional user interface connects to an Ethernet-networked backbone. Further, in one preferred embodiment, the embedded additional user interface connects to a web server through an Ethernet-networked backbone.

In accordance with another preferred embodiment, an embedded user interface system used in association with a gaming machine also includes a web content capable display screen and an embedded processor, as described above. In this embodiment, the dictionary extension receives an incoming text string, parses the text string, initiates a navigation command in response to information in the parsed text string, and navigates the display screen to a uniform resource locator selected by the dictionary extension.

In accordance with still another preferred embodiment, an embedded user interface system used in association with a gaming machine includes a web page display screen and an embedded processor, as described above. Preferably, the web page display screen presents information to a user via the display screen. In this embodiment, the web page display screen is divided into a plurality of frames that are each capable of displaying a different uniform resource locator. Further, in this embodiment, the dictionary extension receives an incoming text string, parses the text string, initiates a navigation command in response to information in the parsed text string, and navigates a frame of the display screen to a uniform resource locator selected by the dictionary extension.

In accordance with yet another preferred embodiment, an embedded user interface system used in association with a gaming machine also includes a web content capable display screen and an embedded processor, as described above. In this embodiment, the dictionary extension receives an incoming text string, parses the text string, and in response to information in the parsed text string, initiates a command that launches a pop-up dialog box over a uniform resource locator presented on the display screen without altering the uniform resource locator presented on the display screen.

One preferred embodiment is directed towards a gaming machine having a gaming presentation. The gaming machine further includes a user interface having a web page display screen, a processor for controlling game play, and a dictionary extension. In this embodiment, the dictionary extension receives an incoming text string, parses the text string, initiates a navigation command in response to information in the parsed text string, and navigates the display screen to a uniform resource locator selected by the dictionary extension.

In accordance with another preferred embodiment, the claimed invention is directed towards a method for increasing user excitement relating to a gaming machine by providing a richer gaming experience via an embedded user interface system that is incorporated into the gaming machine. Preferably, the embedded user interface system includes an embedded processor, a web page display screen, and a dictionary extension. The method preferably includes: receiving an incoming text string, parsing the text string to identify a navigation command and pull a uniform resource locator from the text string, loading the uniform resource locator pulled from the text string into a variable, and indirectly navigating the web page display screen to the uniform resource locator in the variable.

In one embodiment, the web content is protected by digital signature verification using DSA (Digital Signature Algorithm) or RSA (Rivest-Shamir-Adleman) cryptographic technology. In this regard, the content is preferably protected using digital signature verification so that any unauthorized changes are easily identifiable. Of course, other suitable protection techniques may also be used in other embodiments.

Still further, one preferred embodiment utilizes a Message Authentication Code (MAC), which may be used to verify both the content integrity and the authenticity of a message. A Message Authentication Code can be generated faster than using digital signature verification technology, although it is not as robust. In one preferred embodiment, the authentication technique utilized is a BKEY (electronic key) device. A BKEY is an electronic identifier that is tied to a particular individual.

Typically, in a preferred embodiment, the data is authenticatible and non-repudiatible, rather than hidden or otherwise obfuscated (encrypted). Non-repudiation is a way to guarantee that the sender of a message cannot later deny having sent the message, and that the recipient cannot deny having received the message.

In accordance with one preferred embodiment, one or more gaming machine system or embedded additional user interface components (or content) are assigned identification codes. The components are grouped together into a protected group of component bindings using cryptographic security procedures and the identification codes of the components in the bindings group. Accordingly, the bindings prevent falsification or repudiation of content entries with respect to any modifications or replacements of components or content within the bindings group.

In accordance with another aspect of a preferred embodiment, every content entry must be authenticated by being digitally signed with a Hashed Message Authorization Code that is based on the entry itself and on the individual identification codes of the components and content in the bindings group. In the same manner, every entry that attempts a replacement of any of the embedded additional user interface components or content must be authenticated by being digitally signed with a Hashed Message Authorization Code that is based on the entry itself and on the individual identification codes of the components and content in the bindings group.

Preferably, the identification codes of the embedded additional user interface components are randomly or pseudorandomly generated. In accordance with another aspect of the verification system, a Hashed Message Authorization Code key for authenticating access to the component bindings is produced using a SHA-1 hash that is generated using the individual identification codes of the components in the bindings group. Additionally, the embedded additional user interface components are secured within the component bindings using a SHA-1 hash that is generated using the individual identification codes of the components and content in the bindings group.

Other features and advantages of the claimed invention will become apparent from the following detailed description when taken in conjunction with the accompanying drawings, which illustrate by way of example, the features of the claimed invention.

DETAILED DESCRIPTION OF THE PREFERRED EMBODIMENTS

Figure 1:
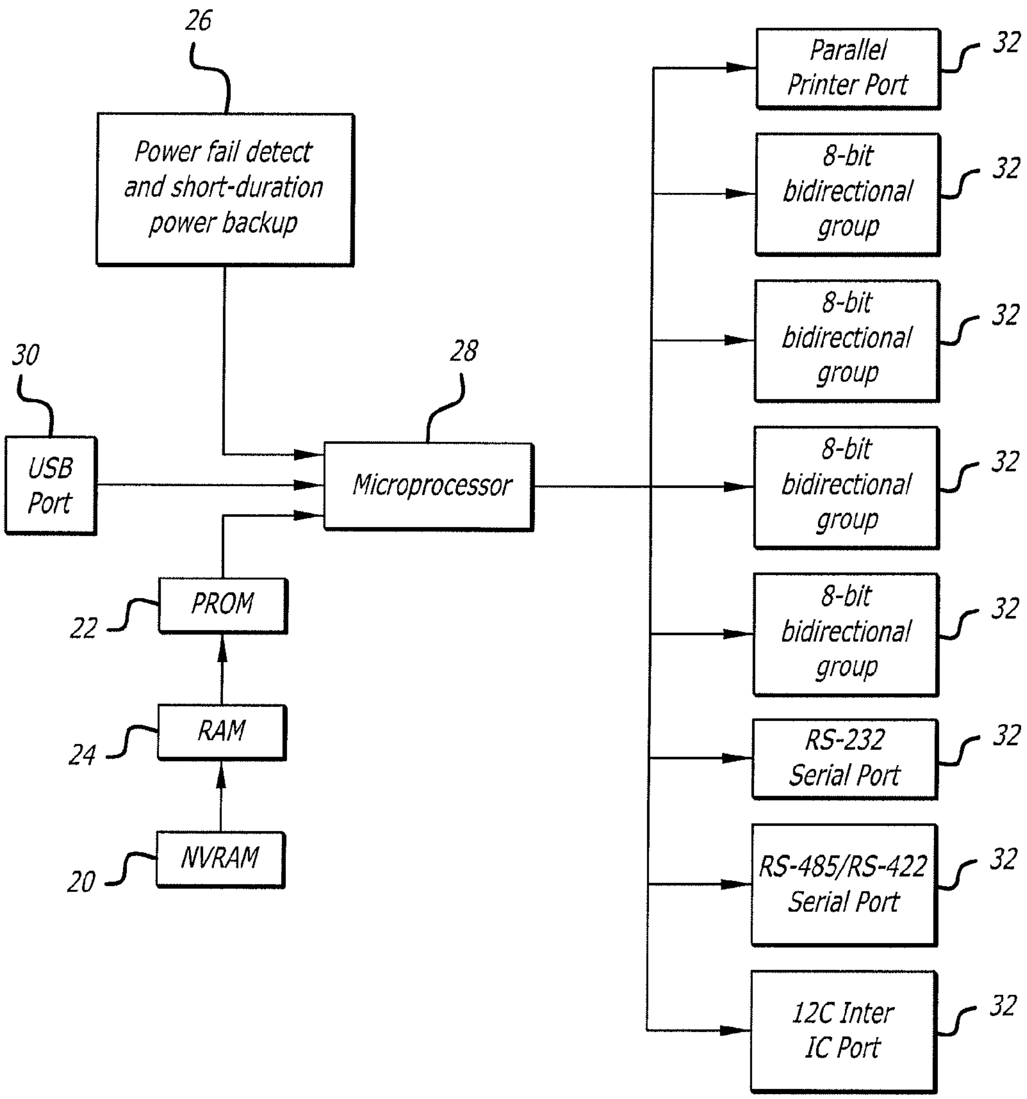
FIG. 1 illustrates a component diagram of the system architecture of a generic device controller unit system, in accordance with the invention.

A preferred embodiment of a generic device controller unit system and methodology constructed, in accordance with the invention, provides a data and protocol communications interface that facilitates "true real time" interconnection between a processor and any of a variety of non-specific peripheral devices sought to be controlled. Referring now to the drawings, wherein like reference numerals denote like or corresponding parts throughout the drawings and, more particularly to FIGS. 1-2, there is shown one embodiment of a generic device controller unit system 10 constructed in accordance with the invention.

Briefly stated, the generic device controller unit (GDCU) system 10 includes a generic "true real time" peripheral device controller and a data and protocol communications interface. The device controller unit system 10 is generic, in that the system 10 is capable of connecting a processor 40 to a number of various peripheral devices 50, instead of being designed to interconnect a processor to only a specific peripheral device. The generic device controller unit system 10 connects a processor 40 using a standard non-true real time operating system and peripheral devices 50 in such a manner as to employ true real time peripheral device control. The "true real time" device controller of the system 10 allows a standard non-true real time operating system to implement true real time control of the peripheral devices 50, instead of requiring a special "true real time" kernel or a special "true real time" layered operating system to be utilized with the processor 40. Moreover, the generic device controller unit system 10 interfaces between the processor 40 and the peripheral devices 50 such that the data and protocol communications interface of the system allows the processor to utilize a single type of protocol and associated data in order to communicate via the GDCU system with the peripheral devices which may be utilizing different types of protocol and associated data.

Described now in greater detail, and again referring to FIGS. 1-2, one preferred embodiment generic device controller unit system 10, constructed in accordance with the invention, preferably provides a "true real time" device controller that produces true real time peripheral device control while interfaced with a processor 40 running standard non-true real time software. A preferred embodiment of the invention provides a method of allowing any definition of true real time for any given application, from one millisecond to one nanosecond. In this manner, the system 10 is adaptable to the true real time requirements of any given application. Preferably, the device controller of the system 10 allows the processor 40 (preferably, but not necessarily functioning in a Win32 environment) to employ "true real time" peripheral device control. The generic device controller unit system 10 provides this real time device control to the resource management capabilities of the standard non-true real time operating system. Advantageously, the generic device controller unit system 10 produces true real time peripheral device control without the higher level functionality of the processor 40. This higher processor level functionality, which has previously been required by specific device controller units, is extremely complex and expensive. The invention consequently reduces such complexity and associated expense. Moreover, the invention allows the use of commercially available, off-the-shelf devices from personal computers, consumer electronics, and industrial control businesses, in order to increase the speed of product development and innovation. This allows changes to be introduced both efficiently and rapidly.

Using the data and protocol communications interface of the system 10, the common interface components from all protocols and associated data are integrated into a single "universal" communications stream, which enables conversion from an existing data and protocol communications stream to any other type of data and protocol communications stream. By "universal," it is meant that the data and protocol communications interface of the GDCU system 10 accepts, for example, the USB protocol and associated data from a processor 40 and converts this protocol and data stream into any of $I^2C$, RS-232, RS-422/RS-485, parallel printer port, 8-bit bi-directional ports, general purpose digital I/O port interfaces, or any other desired protocol and associated data. Conversely, the data and protocol communications interface of the GDCU system 10 accepts these protocols and data streams, and converts them into the USB protocol and its associated data for use by the processor 40. The data and protocol communications interface of the GDCU system 10 provides such generic data and protocol interface for connecting the processor 40 with any desired process control device 50 to be controlled by the system. Thus, by using the GDCU system 10, in accordance with the invention, any device 50, regardless of its chosen protocol and data, can associate with and interface with the processor 40.

More particularly, modem software applications and devices 50 are comprised of numerous internal electromechanical modules which all need to be controlled by and communicate with higher level systems. The GDCU system 10 provides a controller with sufficient additional input/output capability to control any device. The GDCU system 10 contains custom designed system drivers that allow the GDCU system to be a simple controller which includes components that are common to many devices 50, with the device-specific higher intelligence functions carried out by the processor 40. The GDCU system 10 provides input/output functionality while using the host processor 40 as the higher level intelligence in a conventional WINDOWS® operating system environment. The GDCU system 10 is easily modifiable due to its modularity which allows one level to be changed without having to change other levels. For example, encryption and decryption can be added by changing the packet encode and decode layers without having to change the physical transport layers. Similarly, the protocols and associated data can also be simply changed.

As stated above, in a preferred embodiment of the invention, multiple protocols and their associated data can be utilized by a single GDCU system 10. As such, a GDCU system 10 can communicate with multiple devices. The GDCU system 10 allows multiple protocols and functions to be combined into one system, while allowing the GDCU system 10 to always communicate with the processor 40 through a consistent interface. Thus, the processor and operating system are only required to use a single protocol with its associated data to communicate with the GDCU system 10 through the consistent interface. The GDCU system 10 incorporates a unique distributed processing configuration that allows for multiple tasks with arbitrary devices.

Specifically, a preferred embodiment generic device controller system 10 of the invention connects to the processor 40 (sometimes referred to as a master control unit, or a game processor) with associated support hardware. The processor 40 can be any computer, but is preferably a general purpose single board computer including an operating system, software, and associated elements. The single board computer is adapted to plug into an instrument for controlling a process. The preferred operating system is a WINDOWS® NT embedded system image configured to support a protocol, such as USB. Other acceptable operating systems for the processor 40 include, by way of example only, and not by way of limitation: WINDOWS® NT, WINDOWS® 98, WINDOWS® 2000, WINDOWS® CE, LINUX®, QNX®, DOS, VXWorks®, WHISTLER®, and WHISTLER® embedded.

Furthermore, a development station can be used by a developer in order to implement customized solutions on the GDCU system 10. Such a development station is built around the processor 40 and the generic device control unit system 10. The development station provides the hardware and software required to work with these two devices in order to design and realize a sophisticated embedded control system. The development station comes with a number of peripheral and plug-in items. These items include, by way of example only, and not by way of limitation: a floppy drive, IDE CD-ROM and hard drives, AGP video board, keyboard, mouse, PCI 10/100 Ethernet network interface card, and a representative assortment of 32-pin plug-in chips for the MCU board including, but not limited to SRAM, FLASH memory, and M-Systems DiskOnChip®.

In one preferred embodiment of the invention, the generic device controller unit (GDCU) system 10 resolves the hardware interconnect problems that have been experienced in the past by using the industry standard universal serial bus (USB). The universal serial bus was designed by a consortium of major hardware and software manufacturers in order to solve a set of problems that were caused by characteristics and limitations of the "IBM compatible" computer architecture, as it collided with an ever expanding user base of people without specialized technical skills. End users typically want to simply be able to plug in a new device and have it work properly without having to open their computers to install new hardware. The universal serial bus protocol standard was designed to address this need.

The universal serial bus was designed to centralize much of its complexity into the host so that individual devices could be simple and inexpensive. The bus specification allows for each device, as it is plugged in, to tell the USB host what type of device it is, and what device driver should be dynamically loaded so that the device can be used. For these and other reasons, USB is the preferred embodiment physical transport layer for the GDCU system 10. However, it will be appreciated by those skilled in the art that although some USB characteristics are very desirable for GDCU system 10 purposes, the use of the USB protocol standard is desirable, but not necessary. That is, any suitable protocol can be used. The basic generic device controller unit system 10 is independent of any particular physical bus. Accordingly, ATM, Ethernet, CAN, $I^2C$, or multi-drop serial communications could also be used with equal effectiveness in alternate preferred embodiments of a generic device controller unit system 10 in accordance with the invention. Moreover, the system can be configured to drive any network protocol, including, by way of example only, and not by way of limitation: Ethernet, ATM, WAN, Infrared, Serial, and fiber optics.

In a preferred embodiment of the invention, the GDCU system 10 is designed to assist engineers in taking advantage of the universal serial bus technology while saving time and money. Device drivers and USB communications protocols are provided so that an engineer can focus on developing control system applications. Preferably, the GDCU system 10 uses the USB communications protocol to talk to a host computer (e.g., the processor 40) and one or more of the following protocols (listed by way of example only, and not by way of limitation) for communicating with connected devices 50: RS-232 and RS-422/RS-485 serial ports, LPT parallel printer ports, and 32-bit (i.e., four 8-bit) bi-directional digital I/O. Custom designed device drivers and software libraries are also provided. Preferably, the data lines on the GDCU system 10 are configured for I/O using these drivers. Once the data lines are configured, data can be written and its status examined. The application is written with subroutine calls that direct the GDCU system 10 to turn particular bits on or off and then to examine the state of other bits.

In one preferred embodiment of the invention, the processor 40 runs a WINDOWS® application that translates information into commands for the GDCU system 10. The application uses drivers to communicate with the GDCU system 10 via the processor 40 USB port. In one preferred embodiment of the GDCU system 10 of the invention, the data and protocol communications interface is the communications portion of the system 10 which "talks" to the application in the processor 40 and to the different peripheral devices 50. The data and protocol communications interface of the GDCU system 10 allows a "universal" protocol and associated data to be used when interfacing with various physical devices 50. The data and protocol communications interface of the GDCU system 10 allows multiple events having varying input signals to be interpreted by a single generic device controller unit system 10 which is used to control the various peripheral devices 50.

Specifically, FIG. 1 illustrates the system architecture of one preferred embodiment of the generic device controller unit system 10, in accordance with the invention. In this embodiment, the GDCU system includes a serial EEPROM with non-volatile memory 20, a PROM memory 22, RAM external memory 24, power fail detection and short duration power backup circuitry 26, an on-board processor 28, a watchdog timer (not shown), software resources, a universal serial bus port 30, and numerous input/output capabilities 32. These numerous input/output capabilities 32, include by way of example only, and not by way of limitation: Inter Integrated Circuit ($I^2C$) circuitry, RS-232 serial interface circuitry, RS-422/RS-485 serial interface circuitry, 32 general purpose bi-directional I/O lines, and a parallel printer port (and might further include fiber optics, CAN, Ethernet, and ATM).

In the serial EEPROM 20, which provides non-volatile memory, some of the memory is reserved by the GDCU System 10 for its own use (e.g., to store the Device ID code and the serial number), while the remaining memory is available to the user. In one preferred embodiment of the invention, there are at least 512 bytes of non-volatile serial EEPROM memory 20. One preferred embodiment of the invention which requires at least 8K of RAM and NVRAM is satisfied by the Dallas Semiconductor 32K-by-8NVRAM. This memory is powered by a replaceable ten-year lithium battery. Preferably, but not necessarily requiring, there is at least 64K PROM for code and permanent data tables. A 32-pin socket, wired to accept a 27C256 or larger EPROM or FLASH memory, offers 32 kilobytes of program and data table memory. Additionally, there is preferably at least 32K RAM for variables and volatile data storage.

The power fail detection circuitry 26 includes a large electrolytic capacitor which buffers the incoming unregulated 9V power source (which is isolated through a diode) and acts as a power fail detector. The source side of that diode is monitored by an interrupt circuit. The effective result of this configuration is that, in the event of a power failure, the onboard processor is alerted to the power loss several hundred milliseconds before the voltage on the capacitor drops to the point where processing fails. This is sufficient time to store at least 128 bytes of data in the serial EEPROM 20. Preferably, the short duration power backup circuitry provides at least enough back-up power for 200 milliseconds of normal operation subsequent to a power failure. This provides protection for "real time" data in the event of power problems.

Preferably, the on-board processor is an 8051 industry standard 8-bit processor. In one embodiment this microcontroller is a Philips P80C652. This component is essentially identical to the 8051, except that it incorporates $I^2C$ circuitry in addition to the standard UART. Nevertheless, any suitable processor may be used, in accordance with the invention. Other suitable processors include industry standard 8-bit processors by Cypress and Microchip.

The watchdog timer resets the on-board processor when the internal program stops behaving properly and is incorporated to enhance overall reliability. The watchdog timer's operation is transparent to the user.

With respect to the software resources, most user applications can be implemented using the built-in features of the GDCU System 10, but some applications may require custom programming of the onboard GDCU System processor 28. In one preferred embodiment, the GDCU System 10 incorporates 64 Kb of PROM 22 memory space, as well as 32 Kb of external RAM 24, for maximum flexibility for custom applications. Custom code development can be accomplished in several different ways, including contracted customer code development to specific user specifications, and merging custom developer's code with original code at compilation time. In one preferred embodiment, the USB port requirements are satisfied by the Philips PDIUSBD12, which is a USB interface with a parallel processor access port.

In another aspect of one preferred embodiment, the RS-232 and RS-422/RS-485 serial interface circuitry receivers are multiplexed to the same Received Data In signal input on the 8051 computer. Thus, only one of these serial ports can be used at any one time. The MAX202 interface chip is available from Maxim. It creates ±ten volts from the +5V supply in order to deal with RS-232 voltages. The MAX3080 is one of Maxim's parts that matches the industry-standard 75180 pinout for RS-422/485 interfacing. The selection of which of the two interfaces is connected to the 80C652's RXD serial input line is configurable by the processor.

In yet another aspect of one preferred embodiment, the $I^2C$ port is incorporated in the 80C652. Preferably, there is a four-pin header for interfacing with the $I^2C$ port. Preferably, the 32 general purpose bi-directional I/O lines are arranged in four groups of eight lines. All eight lines in each group are either inputs or outputs at any one time. By the use of four ALS646 latching transceivers and two 16V8 programmable Logic Devices to address them, 32 I/O signals are established. They can be configured by the processor as inputs or outputs in groups of eight. Thirteen of those I/O lines perform dual duty as the outputs to the parallel printer port. (The four input lines from the parallel printer port go directly to some otherwise-unused pins on the 80C652).

In another aspect of one preferred embodiment, the eight data lines of the Parallel Printer Port share one of the four general-purpose groups. Four additional output lines on a second general-purpose group are also used. Thus, when the parallel port is in use, two of the groups are dedicated to output, with twelve of the sixteen lines committed to the parallel port. Since the five parallel port input lines go directly to the processor chip, the other two general-purpose I/O groups remain uncommitted.

Referring now to the GDCU System 10 interconnects, all USB devices have a hexadecimal USB Vendor ID and Product ID. The USB specification also provides for a 16 bit Binary Coded Decimal (BCD) device ID, which can range from 0000 to 9999. The device ID is used to specify a particular GDCU board in a system where more than one is attached to the USB bus.

As discussed above, in one preferred embodiment of the invention, the GDCU system 10 is a general-purpose eight bit computer with a USB interface port. In short, it preferably has sufficient PROM and RAM memory to be generally useful for any reasonable interface to external equipment. It has the ability to detect that it is about to be shut down and store critical information in its on-board non-volatile serial EEPROM. For controlling and communicating with other devices it has thirty-two general-purpose I/O lines, an $I^2C$ two-wire interface port, an RS-232 serial port, and a parallel printer port, for a total of sixty-one active I/O signals. The hardware utilized in one preferred embodiment generic device controller unit system 10 of the invention runs applications-specific firmware. The main task of the firmware is to provide proper signals for driving the output devices.

Furthermore, rather than produce unique firmware for every individual device to which the GDCU system 10 may be connected, a generalized protocol is used. This protocol has appropriate commands for configuring the GDCU system 10 (data directions, baud rates, driver enables, and the like) and for transmitting and receiving data. The firmware for the GDCU system 10 implements this protocol. Likewise, matching WINDOWS® or MACINTOSH® device drivers are implemented for relatively low-level communications with the GDCU system 10 from the host computer side. In this fashion, the complicated intelligence needed to interface with any particular device can be kept in the application layers of the host computers that use the GDCU system 10 as a bridge.

Figure 2:
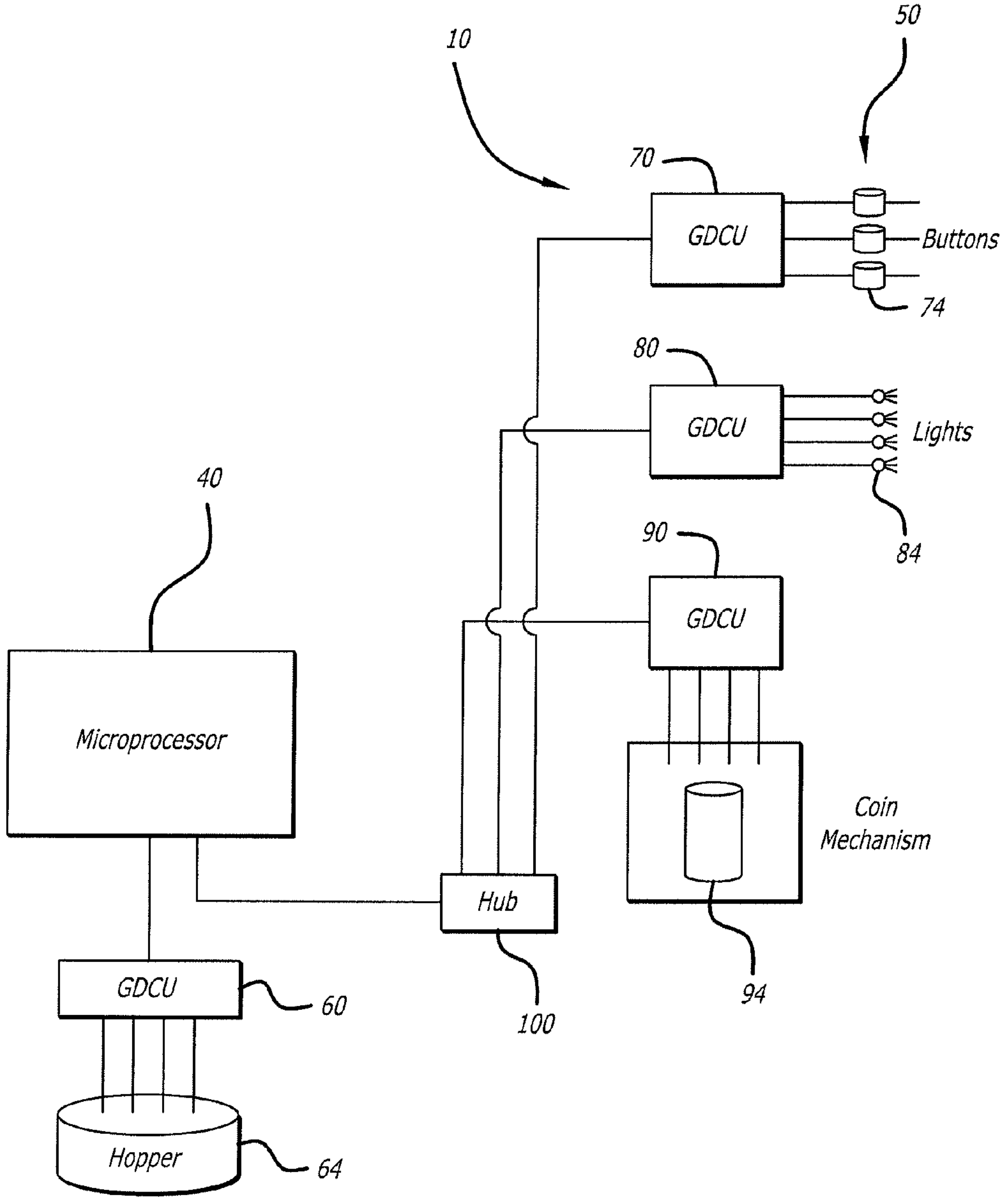
FIG. 2 illustrates an operational flow diagram of a generic device controller unit system of the invention configured to interface with a processor and a single peripheral device.

Referring now to FIG. 2, a generic device controller unit system 10 is shown which is configured to connect a processor 40 for control of a single peripheral device 50 (the peripheral device having multiple tasks which require processor control). This embodiment of the system 10 of the invention utilizes a less powerful processor (e.g., the 8051 processor) and is designed as an "al a carte" or "per device" type of generic device controller unit system 10. In this respect, this embodiment is a simpler, cheaper, and more flexible embodiment of the system 10 of the invention. It allows for control of one peripheral device 50 without the need for expensive circuitry and functionality which is not required for the task at hand.

Specifically, FIG. 2 shows a gaming assembly (by way of example only) that includes a processor 40 connected to a first GDCU system 60 and three additional GDCU systems 70, 80 and 90, connected to the processor 40 via a hub 100. The first GDCU system 60 interfaces with and controls a hopper device 64, while the three additional GDCU systems 70, 80 and 90, each control buttons 74, lights 84, and a coin mechanism 94, respectively. The buttons 74 and coin mechanism 94 are input devices that send information to the processor 40 for data communication and protocol translation via their respective GDCU systems 70 and 90, (through the hub 100). The processor 40 then processes the incoming data, and returns data as appropriate to the GDCU systems 60 and 80, which communicate and translate this data into commands that are sent to the output devices, specifically the hopper 64 and lights 84. This configuration allows additional devices to be easily added, removed, or swapped out since each device has its own generic device controller unit system.

Figure 3:
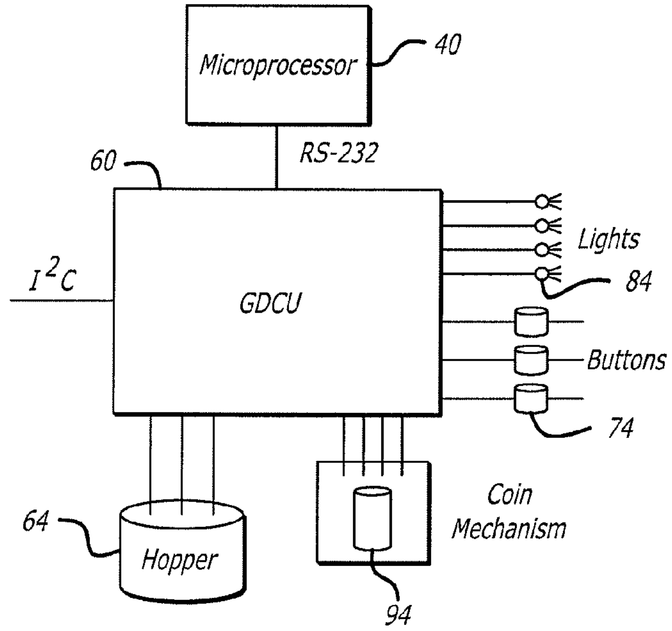
FIG. 3 illustrates an operational flow diagram of a generic device controller unit system of the invention configured to interface with a processor and multiple peripheral devices.

Referring now to FIG. 3, a generic device controller unit system 60 is shown which is configured to connect to a single processor 40 for control of multiple peripheral devices 50. This embodiment of the system 60, in accordance with the invention, utilizes a more powerful processor (e.g., a Motorola 68332 processor), and, as such, functions as a more powerful version of the generic device controller unit system 60. In this respect, this embodiment of the system 60 of the invention is capable of handling a greater amount of input/output device requirements.

Specifically, FIG. 3 shows an assembly that includes a processor 40 connected to a single GDCU system 60. The single GDCU system 60 interfaces with and controls a hopper device 64, buttons 74, lights 84, and a coin mechanism 94, as well as having an $I^2C$ port. In this embodiment, the buttons 74 and coin mechanism 94 are still input devices which send information to the processor 40. However, in this case, both input devices utilize the single GDCU system 60 for data communication and protocol translation with the processor 40. Again, the processor 40 processes the incoming data using the non-true real time operating system, and returns data as appropriate to the GDCU system 60, which then communicates and translates this data into commands which are properly sent to the lights 84 and hopper 64 output devices using the true real time operating system of the GDCU system 10. This configuration allows a single generic device controller unit system 60 to control multiple devices, but still allows for additional devices to be added without requiring the removal and/or modification of the GDCU system 60, hopper device 64, buttons 74, lights 84, or coin mechanism 94.

Figure 4:
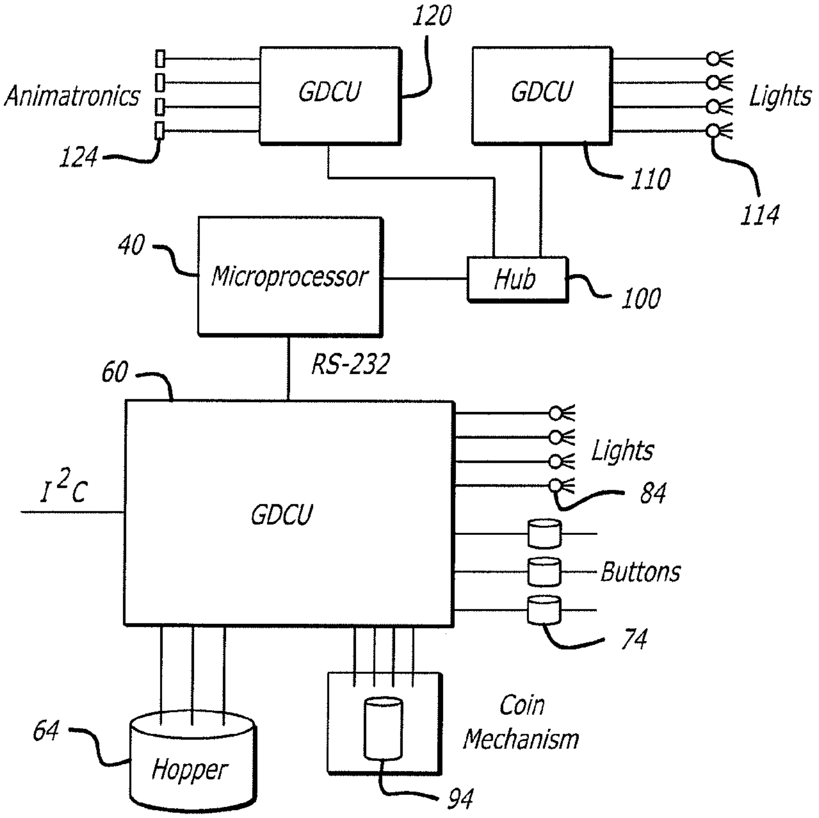
FIG. 4 illustrates an operational flow diagram of a hybrid system of the invention with one generic device controller unit system configured to interface with a processor and a single peripheral device, and a second generic device controller unit system configured to interface with the same processor and various other multiple peripheral devices.

Lastly, FIG. 4 illustrates a hybrid system 10 of the invention with a processor 40 connecting to a plurality of generic device controller unit systems which are each configured to control a single peripheral device, as shown in FIG. 2, and another generic device controller unit system which is configured to control multiple peripheral devices, as shown in FIG. 3.

Specifically, FIG. 4 shows an assembly that includes a processor 40 connected to a first, more powerful GDCU system 60, and two additional less powerful GDCU systems 110 and 120, connected to the processor 40 via a hub 100. As in FIG. 3, the more powerful GDCU system 60 interfaces with and controls a hopper device 64, buttons 74, lights 84, and a coin mechanism 94, as well as having an $I^2C$ port. Once again, in this embodiment, the buttons 74 and coin mechanism 94 are still input devices which send information to the processor 40, and utilize the more powerful GDCU system 60 for data communication and protocol translation with the processor. The processor 40 processes the incoming data, and returns data, as appropriate, to the GDCU system 60, which then communicates and translates this data into commands that are properly sent to the lights 84 and hopper 64 (output devices). As can be seen from the figures, this lower portion of FIG. 4 is the same as FIG. 3.

However, in this embodiment of the invention, the processor 40 also returns data as appropriate to the GDCU systems 110 and 120 (via the hub 100), which then communicate and translate instructions from the processor 40 into commands which are properly sent to the additional lights 114 and animatronics 124 (output devices). This configuration allows a single more powerful generic device controller unit system to control multiple devices; allows for additional devices to be added without requiring the removal and/or modification of the GDCU system 60, hopper device 64, buttons 74, lights 84, or coin mechanism 94; and allows for devices with their own generic device controller unit system (e.g. additional lights 114 and animatronics 124) to be easily added, removed, or swapped out since each device has its own generic device controller unit system.

Previously, for device controller unit systems which were device interface specific, conversion of an existing data and protocol interface to a different data and protocol interface (such as from $I^2C$ to USB) would take substantial development time, effort, and expense, in developing the different code and circuitry required for each process control device. In contrast, the generic device controller unit system 10 of the invention is configured to act as a device-generic, "universal" data and protocol interface.

In this regard, in accordance with the invention, the GDCU system 10 can replace an embedded control system, a multitasking operating system, or any other prior art embedded application. The industry has various names for such an embedded control system. Such names, which include MPU (main or master processing unit), all relate to a single central embedded controller. A single central embedded controller is a complicated device that is capable of including the functionality of a GDCU system 10 and a processor 40 for a specific application. A single embedded control system is capable of controlling both peripheral devices 50 (which are controlled by the GDCU system 10), and application software (which is otherwise controlled by the processor 40). These types of single central embedded controllers are typically undesirable due to their lack of interchangeability and expense (due to having to meet both the GDCU system, processor, and real time operating system requirements). The GDCU system 10 can also eliminate the requirement of having an ISA plug-in card for each activity and the need for a real time layered operating system or expensive and "task specific" real time kernel.

The logical operations of the various embodiments of the invention are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the invention described herein are referred to variously as operations, structural devices, acts or modules. It will be recognized by one skilled in the art that these operations, structural devices, acts and modules may be implemented in the system 10, in firmware, in special purpose logic, analog circuitry, or any combination thereof without deviating from the spirit and scope of the invention as recited within the claims attached hereto. In other words, in a preferred embodiment generic device controller unit system 10 of the invention, the use of an industry standard physical bus, with various elements supplied by different sources, allows a layered software interface concept to be utilized by the invention.

Figure 5A:
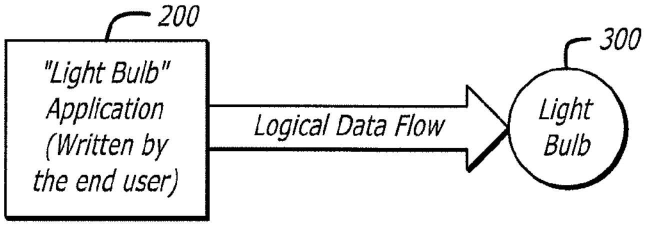
FIG. 5A illustrates a logical data flow diagram from a "light bulb" application to an actual light bulb.
Figure 5B:
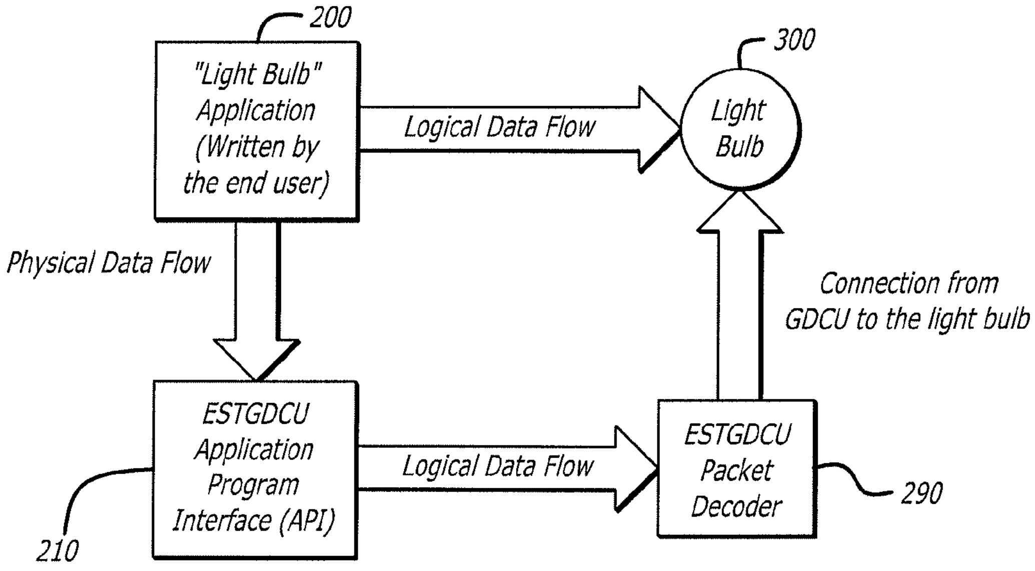
FIG. 5B illustrates a data flow diagram of the top logical transport layer of FIG. 5A, and the logical data flow from an application program interface to a GDCU packet decoder in a second logical transport layer, as well as physical data flow between the top and second layers.
Figure 5C:
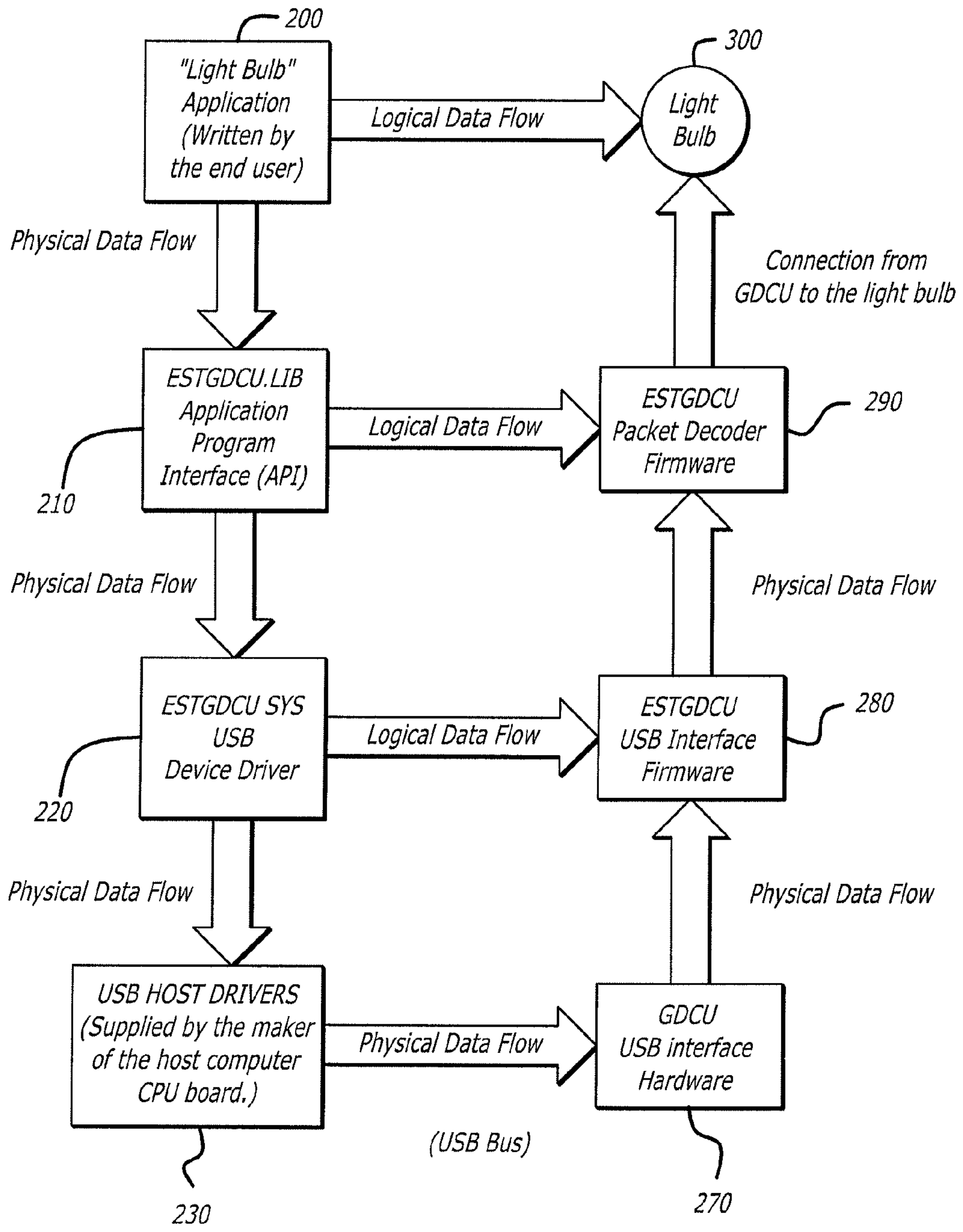
FIG. 5C illustrates a data flow diagram of the top logical transport layer of FIG. 5A, the second logical transport layer of FIG. 5B with physical data flow between the top and second layers, a logical data flow from USB device drivers to a GDCU USB interface firmware in a third logical transport layer, and a physical data flow from USB host drivers to GDCU USB interface hardware in the bottom physical transport layer, as well as physical data flow between layers.

Referring now to FIGS. 5A, 5B, and 5C to illustrate the above concept, consider the act of controlling a light bulb. In this case, a simple WINDOWS® application employs a single push button. As shown in FIG. 5A, according to this application, when the button is clicked with a mouse, a light bulb is illuminated. There is, of course, no physical connection between the WINDOWS® light bulb application 200 and the light bulb 300, but logically there is a connection. This very top layer of the communications and control structure is depicted as logical data flow from a light bulb application 200 to the actual light bulb 300.

Logically, this represents the desired implementation. The user's application wants to be able to turn the light bulb on and off without worrying about all of the system level requirements that are actually needed in order for this light bulb switching task to be implemented. However, a WINDOWS® application has no way of talking to a light bulb. As shown in FIG. 5B, what the application actually does is talk to an additional layer of software below it. The light bulb application 200 sends a physical data flow down to an application program interface (API) 210 which sends a logical data flow across to a packet decoder 290 which in turn is connected to the actual light bulb 300.

The light bulb software engineer has been told by the overall system designer that his light bulb is connected, for example, to Bit 3 on I/O Port 2 of the GDCU board, and that when the bit is set to High, the bulb will turn on. So when it is time to turn on the light bulb, all the "light bulb" application has to do is call the appropriate API library routine with the instruction "Set Bit 3 on I/O Port 2 to High."

The "light bulb" application 200 neither knows nor cares how the API routine 210 is going to arrange to turn on the bit. The application 200 does not know if the API routine 210 will perform the action itself, send a TCP/IP packet over the internet to a light bulb in Cleveland, or send e-mail to a janitor. The application just sends the request down and expects that the bulb will, indeed, turn on.

Likewise, the API routine 210 doesn't know why the "light bulb" application 200 wants the Bit set to High. What it does know how to do is encode the instruction "Set Bit 3 on I/O Port 2 to High" into a GDCU data packet that it then sends, in the logical sense, over to the matching GDCU data packet decoder 290 that resides in the firmware of the GDCU board. When the GDCU packet decoder 290 receives the packet, it pulls it apart and examines the packet. The packet decoder 290 learns that it is one of the packet types for controlling the digital I/O data bits on the GDCU board, and Sets Bit 3 on I/O Port 2 to High, which causes the light bulb to light.

Once again, this is a logical connection. As shown in FIG. 5C, the API packet encoder routine 210 in the host computer cannot talk directly to the packet decoder 290 in the GDCU firmware. In the actual physical data flow communications path, physical data flows down from the light bulb application 200 to the application program interface (API) 210, down from the API 210 to the USB device driver 220, down from the USB device driver 220 to the USB host drivers 230, from the USB host drivers 230 across to the GDCU USB interface hardware 270, from the GDCU USB interface hardware 270 up to the GDCU USB interface firmware 280, from the GDCU USB interface firmware 280 up to the GDCU packet decoder firmware 290, which is finally connected to the light bulb 300 itself. Thus, two additional levels have been added to the structure.

The bottom layer in the above-described actual communications path is the physical transport layer. In one preferred embodiment GDCU system 10 of the invention, that is the hardware of the universal serial bus. The interfaces on both sides of the bottom layer are supplied by the manufacturers of the USB interface hardware. As mentioned previously, since USB is a more frequently and more widely used protocol, there are numerous chip sets for both host and device side interfaces which adhere to the published USB specifications for physical and electrical interconnections.

On the host side of the connection, there are two logical protocols that have been defined by the USB user's group for USB communications. One is the universal host control interface (UHCI), and the other is the open host control interface (OHCI). In either case, the manufacturer supplies a WINDOWS® device driver which allows the next layer up to communicate with the hardware.

The generic device controller unit system 10 typically has much less computational power available than does the host, and the operating system requirements (if any) are much simpler. The various makers of such chip sets have simple interfaces that allow a calling routine to determine the status of the USB, send a block of data, receive a block of data, and the like.

Returning to the host side, the job of translating between the application level GDCU software routines and the bottom level hardware routines is implemented by the GDCU device driver. This routine is effectively part of the operating system. Operating with trusted kernel level privileges, it can take the GDCU packets from the layer above and send them down to the hardware to be transmitted to the device. Logically, those USB data blocks are transmitted horizontally to the USB interface level of the firmware of the GDCU system 10. The USB interface level has the job of talking to the hardware, accepting the packets, and passing them upwards to the packet decoder.

For simplicity, the communications path has been described (and shown in FIGS. 5A-5C) as a unidirectional flow. In actuality, however, the communications are bi-directional, with the communications path arrows flowing in both directions. The above-described layered structure, although seemingly complex, actually conveys a greater flexibility in design. Each layer can be replaced without affecting the layers below it or above it.

For example, it may be desired to encrypt the GDCU data packets in order to prevent their content from being ascertained on the bus, or to implement data compression to improve data transmission time. This would only require changing the GDCU application program interface level on the host side, and rewriting the packet decoder level on the device side. Everything else would stay the same.

As an additional example, the physical transport layer could be changed from USB to ATM. Thus, the bottom layer would have to change. On the host side, a different GDCU device driver would have to be supplied, because its interface with the bottom level would be different. However, everything else on the host side would remain the same. Correspondingly, on the device side, the GDCU USB interface firmware that interfaces with the communications hardware would have to be rewritten and changed, because the hardware would change. Again, however, its interface upward would remain the same.

From the point of view of the system designer and application developer, the functionality of the bottom three levels can be ignored. All they need to know is the capabilities of the GDCU system 10, and how to access them. As far as the application developer is concerned, the answer to those questions lie in the interface specifications of the GDCU application program interface software. The layered structure of the GDCU system 10 means that functionality can be changed or augmented by changing the GDCU API software on the host, and the packet decoder level on the device. Such functionality can be altered without paying attention to the transport levels below, and likewise the transport levels can be changed without requiring any altercations to the higher levels. This results in shorter development time and quicker time to market.

Referring now to the software resources, in one preferred embodiment to the invention, a program is provided called GDCUCONFIG, which is used to change the Device ID on a GDCU board. Using GDCUCONFIG, the designer assigns a unique Device ID to each GDCU board. Then, when an application using the GDCU calls the various library routines to perform an I/O request, it specifies the Device ID for the target GDCU board.

With respect to the GDCU System 10 library software, in a preferred embodiment to the invention, the following five files are used to compile and link the library software: ESTGDCU.H—Declarations and definitions; ESTGDCU.LIB—Multithreaded; ESTGDCUL.LIB—Multithreaded DLL; ESTGDCUD.LIB—Debug Multithreaded; and ESTGDCUDL.LIB—Debug Multithreaded DLL. The ESTGDCU.H must be included in the source file. The library selected depends on the choice of code generation.

The GDCU System 10 library routines are as shown generally in the following table:

| ROUTINE | FUNCTION |
|---|---|
| GdcuSetPort Direction | Sets the direction of one of the four 8-bit ports |
| GdcuSetPortData | Sets the output data on one of the digital I/O ports |
| GdcuSetAllPortsData | Sets all four data ports in a single call |
| GdcuGetAllPortsData | Gets the data from the digital I/O ports |
| GdcuSelectRS232 | Sets the serial I/O to RS-232 and established the baud rate |
| GdcuSelectRS422 | Sets the serial I/O to RS-422/RS-485 and establishes the baud rate |
| GdcuSendSerialData | Puts a block of data into the serial output buffer |
| GdcuReceiveSerialData | Returns any received serial data |
| GdcuNvmRead | Reads data from the non-volatile serial EEPROM |
| GdcuNvmWrite | Writes data to the non-volatile serial EEPROM |
| GdcuGetFirmwareVersion | Returns the firmware version of the GDCU board |
| CountOurUsbDevices | Returns a count of GDCU boards and enumerates their symbolic handles (low-level routine) |
| GetGdcuSerialNumbers | Returns the serial numbers and status of all GDCU boards (low-level routine) |
| GdcuWrite | Transfers data from the host to the device (low-level host-to-device data transfer) |
| GdcuRead | Transfers data from the device to the host (low-level device-to-host data transfer) |

The following section outlines the usage information for the GDCU System 10 library routines. In one preferred embodiment of the invention, the GDCU System 10 routines include the following: CountOurUsbDevices, GdcuGetAllPortsData, GdcuGetFirmwareVersion, GdcuNvmRead, GdcuNvmWrite, GdcuRead, GdcuReceiveSerialData, GdcuSelectRS232, GdcuSelectRS422, GdcuSendSerialData, GdcuSetAllPortsData, GdcuSetPortData, GdcuSetPortDirection, GdcuWrite, and GetGdcuSerialNumbers.

The GDCU System 10 CountOurUsbDevices routine returns the number of GDCU boards currently attached to the system's USB bus. Each of those devices has a complicated device name which is assigned by the system. Those names are filled into the ppDeviceNames array. This array should be cleared before the first time the CountOurUsbDevices routine is called. If any of the ppDeviceNames pointers are not NULL, this routine attempts to release them with the C++ delete operator. Subsequent calls to CountOurUsbDevices cause the enumeration to be performed again, thus freeing up the results from any previous calls. It is up to the user to free up the memory represented by those character strings after the final call to CountOurUsbDevices.

The CountOurUsbDevices routine is used internally by other library routines for keeping track of the GDCU boards attached to the system. However, it is not required for normal use. This routine, together with the GetGdcuSerialNumbers routine is provided as a convenience for enumerating all of the boards connected to the system.

In a preferred embodiment of the invention, the GDCU System 10 GdcuGetAllPortsData routine retrieves the data from the digital I/O ports. After specifying the device ID of the target GDCU board (BDC value 0000 through 9999), the size of the pbyData array is initialized (which can be any value 1 through 5). The pbyData array is the array of BYTES to be filled by the routine.

GdcuGetFirmwareVersion routine retrieves the version level of the GDCU firmware. The GdcuNvmRead routine reads to the non-volatile serial EEPROM memory in blocks of sixteen bytes. The routine contains a pointer to the array of bytes to be filled and the available size of the array in bytes.

Further, the GdcuRead routine transfers data from the device to the host. This routine also includes a pointer to the buffer to be filled from the GDCU System 10, as well as arguments for the available size of the buffer and the number of bytes received. The GdcuRead routine is only used when custom code is created for the GDCU firmware. The GdcuRead routine should not be called unless there is information in the GDCU System 10 waiting to be transferred. If the GDCU System 10 receives a read request from the USB host when it does not have data to go out, it responds by sending back a single ASCII question mark character.

The GDCU System 10 library contains the GdcuReceiveSerialData routine which returns any received serial data. This routine also includes a pointer to the array of bytes to be filled, as well as arguments directed towards the available size of the array and the number of bytes received in the array.

The GdcuSelectRS232 routine sets the serial I/O to RS-232 and includes an argument which determines the baud rate to be one of 300, 600, 1200, 2400, 4800, 9600, 19200, or 38400. Any other value causes the circuitry to default to 2400. Although the GDCU System 10 contains circuitry for both RS-232 and RS-422/RS-485 communications, only one of those can be enabled at one time. Calling this routine specifies subsequent RS-232 communications.

In a preferred embodiment of the invention, the GDCU System 10 library also contains the GdcuSelectRS422 routine. This routine sets the serial I/O to RS-422/RS-485 and contains an argument directed towards determining the baud rate to be one of 300, 600, 1200, 2400, 4800, 9600, 19200, or 38400. Once again, any other value causes the circuitry to default to 2400. This routine also contains a OutputOn argument which is used to specify between the TRUE RS-422 mode (the default), and the FALSE RS-485 mode. As discussed above, although the board contains circuitry for both RS-232 and RS-422/RS-485 communications, only one of those can be enabled at one time. Calling this routine specifies subsequent RS-422/RS-485 communications. The difference between RS-422 and RS-485 communications is that the RS-422 is continuously enabled, while RS-485 output drivers are only enabled when the device is transmitting. One preferred embodiment of the invention also contemplates this routine to contain arguments to support automatic switching of the driver to the ON state while transmitting.

The GDCU System 10 library also includes the GdcuSendSerialData routine which puts a block of data into the serial output buffer. This routine contains a pointer to the array of bytes to be transmitted, as well as an argument directed towards the number of bytes to be transmitted. This routine does not return until all of the bytes in the buffer have been transmitted to the GDCU System 10.

Additionally, the GDCU system 10 library further includes the GdcuSetAllPortsData routine which sets all four data ports in a single cell. This routine contains a pointer to four bytes of data to be latched into the four output ports. The pbyData argument must point to a valid array of at least four bytes to avoid possible memory exception errors.

Continuing, the GDCU System 10 library includes the GdcuSetPortData routine. This routine contains arguments which set the following values: GDCU_PORT__0: the port on connector J8; GDCU_PORT__1: the port on connector J9; GDCU_PORT__2: the port on connector J10; and GDCU_PORT__3: the port on connector J11. This routine also contains an argument specifying eight bits of data to be latched into the port. It should be noted that data can be latched into a port even when it is set to GDCU_PORT_INWARD. When the port direction is subsequently switched to GDCU_PORT_OUTWARD, the previously latched data appears on that port at that time.

The GDCU System 10 library also contains the GdcuSetPortDirection routine which sets the direction of one of the four 8-bit ports. This routine contains some of the same arguments as in the GdcuSetPortData routine relating to setting the values of the GDCU ports 0-3 to the ports on connectors J8-J11, respectively. The GdcuSetPortDirection routine further contains arguments directed towards the following values. GDCU_PORT_INWARD: read the port; and GDCU_PORT_OUTWARD: drive the port.

Further, the GDCU System 10 library also contains the GdcuWrite routine which transfers data from the host to the device. This routine contains a pointer to the buffer to be sent to the GDCU, as well as arguments relating to the number of bytes to be sent to the buffer (buffer size), and the number of bytes finally sent (bytes transferred). The GdcuWrite routine is only used when customer code is created for GDCU firmware.

Finally, the GDCU System 10 library also includes the GetGdcuSerialNumbers routine. This routine contains several pointers, the first of which is a pointer to an array of 127 character pointers containing the system-defined names for the GDCU boards on the bus. This array is filled using the CountOurUsbDevices routine. The GetGdcuSerialNumbers routine also contains a point to an array for 127 BOOL variables. On return, this array contains TRUE for each valid DeviceName (FALSE means something is wrong with the board. Either some other routine has a handle to it open at this time, or there has been a surprise disconnect during the last few seconds, and the system has not yet decided that it no longer exists.). The routine also contains a pointer to an array of 127 WORD variables. Each WORD variable gets filled in with the Device ID for each valid GDCU board currently attached to the USB bus. Finally, the GetGdcuSerialNumbers routine also contains a pointer to an array of 127 DWORD variables. Each one of these DWORD variables gets filled in with the binary serial number of each valid GDCU board currently attached to the USB bus. The GetGdcuSerialNumbers routine is used internally by other library routines for keeping track of the GDCU boards attached to the system. It is not required for normal. This routine, together with the CountOurUsbDevices routine is provided as a convenience for enumerating all of the boards connected to the system.

In summary, a preferred embodiment generic device controller unit system includes a generic "true real time" peripheral device controller and a data and protocol communications interface. The system is generic, such that the system is capable of connecting a processor to any number of various peripheral devices, instead of being designed to interconnect a processor only to a specific peripheral device. The system interfaces between a standard non-true real time operating system and peripheral devices in such a manner as to employ true real time peripheral device control, while allowing for bandwidth sharing, data speed differences, and accommodating for various levels of interrupt priority. The device controller of the system allows a standard non-true real time operating system to implement true real time control of peripheral devices. The system interfaces between a processor and peripheral devices such that the data and protocol communications interface of the system allows the processor to utilize a single protocol and associated data in order to communicate with peripheral devices which are utilizing different protocols and associated data.

In a preferred embodiment of the invention, device connection is not limited to a few number of corn ports, since the hardware interface of the system allows large numbers of devices to be "daisy-chained" together. The invention eliminates the need to rely on corn ports, which are slow (typically 9600 baud) and, further, which do not address the need to mix high speed data (video) and low speed data (mouse clicks) communications, as does a preferred embodiment of the invention. Moreover, a preferred embodiment of the invention allows the use of commercially available, off-the-shelf, devices from the personal computer, consumer electronics, and industrial control businesses, which increases the speed of product development and innovation. In addition, the invention eliminates the need for developers to have to perform undesirable WINDOWS® device driver development work. Finally, the GDCU system 10 of the invention is adaptable to the true real time requirements of each particular application, therefore, allowing virtually any definition of true real time for use in any given application, (e.g. from one millisecond to one nanosecond).

While the generic device controller unit system of the invention has been described with respect to gaming systems and gaming assemblies, it will be appreciated by those of ordinary skill in the art that the generic device controller unit system and methodology can be readily applied in various other non-gaming technological areas. These other non-gaming technical areas include, by way of example only, and not by way of limitation; manufacturing, amusement parks, control systems, security systems, and mechanical assembly production lines.

A preferred embodiment of the embedded additional user interface, constructed in accordance with the invention, is directed towards the integration of an embedded additional user interface into a gaming machine to increase user excitement by providing a richer gaming experience. The embedded additional user interface provides enhanced player satisfaction and excitement, as well as improved gaming device reliability, interactivity, flexibility, security, and accountability. The user interface is sometimes referred to herein as "additional" in that the user interface is separate from the gaming screen (or other gaming presentation). Further, the user interface is sometimes referred to herein as "embedded" in that the user interface includes its own processor in some preferred embodiments of the invention. Additionally, the display screen, which is referred to herein commonly as a web content capable display screen, may also (or alternatively) be an animation capable display screen, a web page display screen, or a multimedia display screen.

Figure 6:
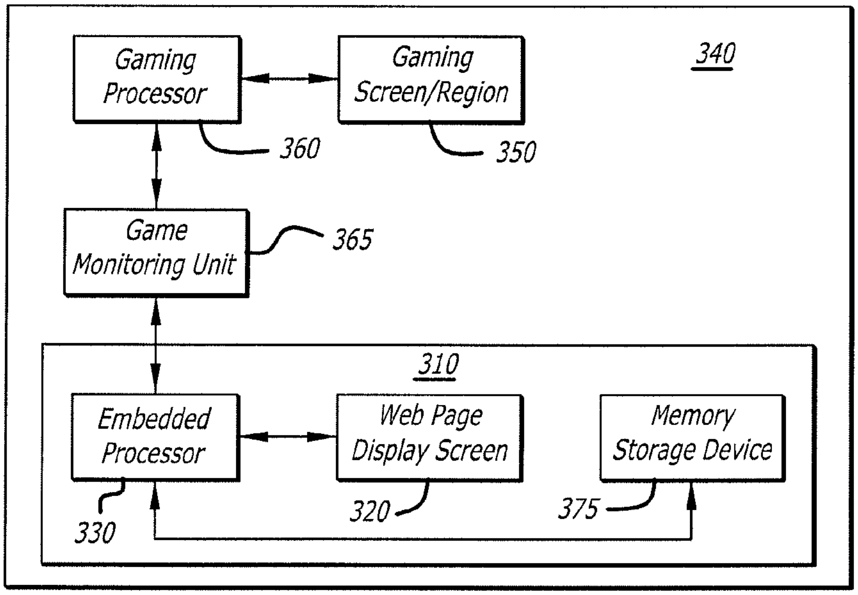
FIG. 6 illustrates a relational diagram of an embedded additional user interface, constructed in accordance with the claimed invention, utilizing a web page display screen and an embedded processor that receives data messages from a game monitoring unit that are translated into web page content and mapped to the web page display screen.

Referring now to the drawings, wherein like reference numerals denote like or corresponding parts throughout the drawings and, more particularly to FIGS. 6-10, there is shown one embodiment of an embedded additional user interface 310. Specifically, FIG. 6 shows an embedded additional user interface 310 that includes a web page display screen 320 and an embedded processor 330. The user interface 310 is incorporated into a gaming machine 340 that, in turn, includes a gaming screen 350, (and/or non-screen gaming region 350, e.g., spinning reels or other gaming presentation) gaming processor 360, and a game monitoring unit 365. The embedded processor 330 employs an internal operating system and communicates with the gaming processor 360, preferably via the game monitoring unit 365. The embedded processor 330 reads incoming data, translates the data into a web authoring language, and maps the data to the web page display screen 320. The display screen 320 presents web page information to a user via the display screen, thereby increasing user excitement by providing a richer gaming experience. The game monitoring unit 365 monitors the information that is input through the user interface 310. This provides a dramatic improvement over traditional system components 370 that have been used as in the past to provide user information. The user interface 310 communicates with the game monitoring unit 365 in the same manner as the previous system components 370 communicated with the game monitoring unit.

Figure 7:
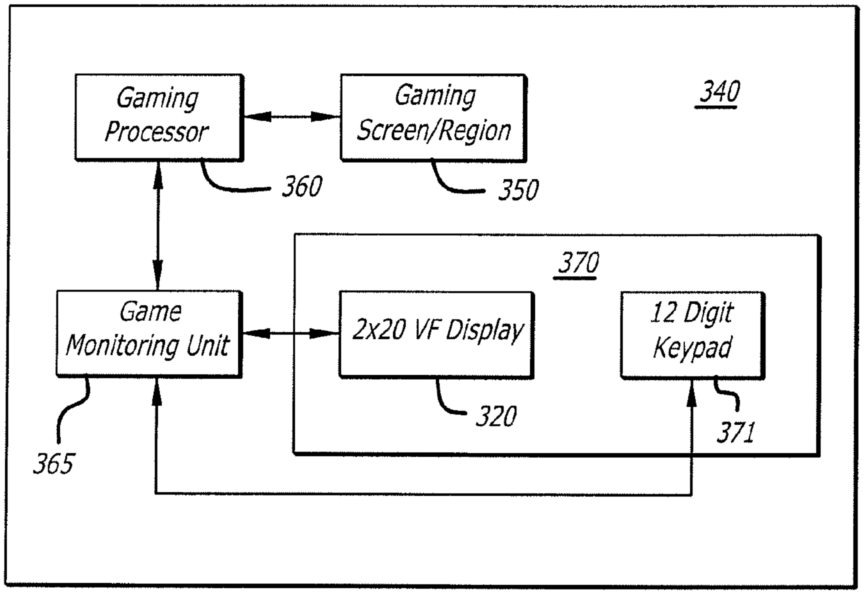
FIG. 7 illustrates a relational diagram of a prior art gaming system that utilizes a 2×20 VF display and 12-digit keypad.

As shown in FIG. 7, prior art gaming devices typically utilized a single video display screen as a gaming screen 350 for the gaming machine 340, while additional system components 370 were attached or juxtaposed next to the gaming machine. The display may comprise, for example, a 2-line, 20 character VF (Vacuum Fluorescent) display 320. An input device may comprise a 12-digit keypad 371.

However, referring again to FIG. 6, in a preferred embodiment of the invention, the system components 370 that were used in prior art systems are replaced with the embedded additional user interface 310 to provide the advanced functionality of a web page display screen 320. Such functionality includes, by way of example only, and not by way of limitation, the ability to display animation, multimedia, and other web-type content. The embedded additional user interface 310 enables presentation of additional information (e.g., enhanced player information) to a player (or potential player) through the web page display screen 320 in an exciting, eye-catching format, while not interfering with the normal gaming processes being displayed on the gaming screen 350. Further, the embedded additional user interface 310 does not interfere with the normal gaming hardware in the gaming machine 340, but rather is easily integrated into a gaming machine 340.

In situations involving multiple gaming machine (or gaming component) manufacturers, an embedded additional user interface 310 can be incorporated into a gaming machine (either originally or by retrofitting) without requiring access to the game logic or other gaming systems that might be proprietary and inaccessible with a gaming machine from another gaming manufacturer. Thus, in a preferred embodiment of the invention, the embedded additional user interface 310, which includes a web page display screen 320 for presenting supplementary information to a player, is incorporated into a gaming machine 340 in addition to the standard gaming screen 350 typically found in a gaming machine. The embedded additional user interface 310 may also be incorporated into a gaming machine 340 that utilizes a gaming region (e.g., a reel-spinner) instead of a standard gaming screen 350. This supplemental information may include general gaming information, player specific information, player excitement and interest captivation content, advertising content (targeted or otherwise), and the like. Further, in other preferred embodiments, the embedded additional user interface 310 may have the ability to interact with the game logic of the gaming processor 360, preferably via the game monitoring unit 365, and thus, provide further functionality, such as bonus games, system games, and/or the ability to incorporate awards, promotional offers, or gifts from the web page display screen 320 to the gaming screen 350. Moreover, the web page display screen 320 may display supplemental information in an "attract mode" when there is no game play occurring. Also the gaming processor 360 may use the web page display screen 320 to present casino employees with a web based dialogue to facilitate gaming machine configuration and event investigation activities without disturbing the gaming screen/region 350.

In a preferred embodiment of the invention, the embedded additional user interface 310 is used to make casino services more accessible and friendly to casino patrons. In one preferred embodiment, the embedded additional user interface 310 is designed to interface with the hardware configuration of game platforms currently employed in an existing gaming communication systems network, thus decreasing implementation costs for the casino. A standard gaming network interface to the systems network, such as a Mastercom system, includes a multi-drop bus method of communicating to a keypad and display. The Mastercom system is available from Bally Manufacturing, and is described in U.S. Pat. No. 5,429,361 to Raven et al. incorporated herein by reference. One such currently utilized bus is an EPI (Enhanced Player Interface), which uses an industry standard $I^2C$ bus and signaling.

In one preferred embodiment, the embedded additional user interface 310 is used to replace/upgrade an EPI. Preferably, the embedded additional user interface 310 replaces the EPI of the gaming machine in a "plug and play" manner. In other words, the old EPI can be unplugged and the new embedded additional user interface 310 can simply be plugged into the $I^2C$ bus of the game monitoring unit 365 in the gaming machine 340. The user interface 310 utilizes the currently employed industry standard $I^2C$ bus and signaling without requiring any further modification. The embedded processor 330 of the embedded additional user interface 310 reads incoming $I^2C$ data (content), translates the data into a web authoring language (e.g., HTML, DHTML, XML, MACROMEDIA FLASH), and maps the data to the web page display screen 320. In this manner, the previous $I^2C$ data messages, which were typically presented on a 2-line, 20 character VF display, are automatically transformed by the embedded additional user interface 310 into an attention grabbing, animated (multimedia) web page style format. This results in enhanced player satisfaction and excitement with extremely minimal retrofitting requirements.

Since, in one preferred embodiment, the embedded additional user interface 310 utilizes $I^2C$ hardware and signaling, this enables the user interface 310 to speak and understand the $I^2C$ protocol message set, and thus, communicate directly with the gaming processor 360 of the gaming machine 340 (or other similarly networked devices) in the same fashion in which the gaming processor previously communicated with the EPI. Accordingly, in a preferred embodiment of the invention, the functionality of the previously utilized hardware (e.g., the EPI) can be replaced or augmented and thus substantially upgraded with the integration of the embedded additional user interface 310 into the gaming machine 340. As such, the limitations placed upon the gaming processor 350 by the low function external hardware of such system components 370 (e.g., a keypad and a 2-line, 20 character VF display) may be eliminated.

As stated above, in one preferred embodiment, the incoming data received by the embedded additional user interface 310 is in $I^2C$ signaling protocol; however, in other preferred embodiments other serial communication protocols (or electronic communication format) may be utilized. Preferably, the embedded processor 330 communicates with the gaming processor 360 via the game monitoring unit 365, and/or other connected devices, over an $I^2C$ bus (or over another serial communications bus in embodiments that utilize another protocol). The web page display screen 320 of the embedded additional user interface 310 is preferably a color-graphic touch screen display. Preferably, the embedded processor 330 is at least a 32-bit processor. A preferred embodiment utilizes a 32-bit processor because cryptographic techniques, such as SHA-1 (or better) and DSA algorithms, are written and operate natively on a 32-bit system. Additionally, the Microsoft® WINDOWS® environment, which is utilized in some preferred embodiments of the invention, is also 32-bit. Further, the internal operating system of the embedded additional user interface 310 may be adapted or customized to match the specific communication bus hardware used by the devices in the gaming machine 340 to which the internal operating system communicates.

Preferably, the embedded additional user interface 310 is an embedded computer board that, in addition to the embedded processor 330 and the web page display screen 320, further includes a removable COMPACT FLASH® card 375 (or other memory storage device), as shown in FIG. 6, and a network adapter port. Content and feature updates to the embedded additional user interface 310 are accomplished by physically swapping out the COMPACT FLASH® card 375 (or other memory storage device). Thus, in order to retrieve data from the embedded additional user interface 310, the data is accessed by physically removing and reading the COMPACT FLASH® card 375. In other embodiments, as described below, updates may be provided by direct or peer-to-peer downloading over a network.

In one preferred embodiment, the internal operating system utilized by the embedded processor 330 of the embedded additional user interface 310 is WINDOWS® CE version 4.2 (or higher). Preferably, the embedded additional user interface 310 is built upon a PXA255-based board developed by the Kontron Corporation. Additionally, in a preferred embodiment of the embedded additional user interface 310, the browser control for the web page display screen 320 is MICROSOFT® INTERNET EXPLORER® 6.0 (or higher), which is shipped standard with WINDOWS® CE 4.2, the preferred internal operating system for the embedded processor 330.

A preferred embodiment of the embedded additional user interface 310 also provides a mechanism for inputting system information into, and retrieving system information from, the game machine 340. As stated above, the embedded additional user interface 310 preferably uses industry standard $I^2C$ hardware and signaling. The $I^2C$ protocol has multi-master capabilities, i.e., is capable of participating as both a slave and as a master. The embedded additional user interface 310 enables system information (such as information input by a player into a web page display screen 320) to be sent from the game machine 340 to a slot system network (or to another destination location). Likewise, the embedded additional user interface 310 also enables the system information (such as display messages) to be sent from the systems network (or from another source location) to the game machine 340 for viewing by the player through the web page display screen 320.

In a preferred embodiment, information can also be input by a user into the web page display screen 320 of the user interface 310. The web page display screen 320 of the user interface 310 employs a virtual keypad. Further, the user interface 310 uses a keypad dictionary that allows a user to be able to enter a vastly greater amount of information than was previously possible using a 12 digit VF keypad. For example, the virtual key on the touch screen that is displayed by the browser is pressed by a user. This calls the Keypad object by calling its Dispatch interface with a string that identifies which virtual key was pressed. The Keypad object looks up the string in the Dictionary object which has been loaded at initialization time with a set of keys to return when that string is passed to it. When it retrieves this set of zero or more key characters, it passes them to the GMU by calling the interface exposed by the object.

Typically, a network interface (or equivalent system) is used to control the flow of funds used with the gaming machine 340 within a particular casino. By utilizing the embedded additional user interface 310 of the invention, the gaming network interface can be instructed to move funds between player's accounts and gaming devices by merely touching the web page display screen 320. In addition, many other more sophisticated commands and instructions may be provided. Thus, the embedded additional user interface 310 improves the player and casino employee interface to the gaming machine 340, directly at the gaming device itself.

In a preferred embodiment of the invention, the web page display screen 320 of the embedded additional user interface 310 enables a player to be shown player messages in an animated, multimedia, web content style environment. These messages would previously have been displayed in a significantly more mundane format on a separate display device (e.g., a 2-line VF display device). In some preferred embodiments, touch screen buttons in the web page display screen 320 are used by the player to navigate between windows in web page display screen 320 and allow access to system functions such as cashless withdrawal, balance requests, system requests, points redemption, and the like. In other preferred embodiments of the invention, the web page display screen 320 utilizes various other data input techniques commonly known in the art, instead of the touch screen data entry. Thus, implementation of the embedded additional user interface 310 is an efficient, highly beneficial, and substantial upgrade to a gaming machine 340 that greatly increases the functionality over what was previously possible using an EPI.

In one preferred embodiment, text data messages are translated into web page navigation requests by the embedded processor 330 and then displayed on the web page display screen 320 as shown and discussed with respect to FIGS. 11A and 11B below. Script languages, such as JAVA SCRIPT and VB SCRIPT, are also utilized for some of the web pages. Preferably, the embedded additional user interface 310 emulates the 12-digit keypad and the 2×20 VF display on the web page display screen 320, which has touch screen capabilities. In this embodiment, commands that were previously displayed on the 2×20 VF display are matched to a corresponding URL and a browser is used to render the page on the web page display screen 320. The web pages displayed contain touch-screen keys that effectively emulate hardware keys.

Figure 11A:
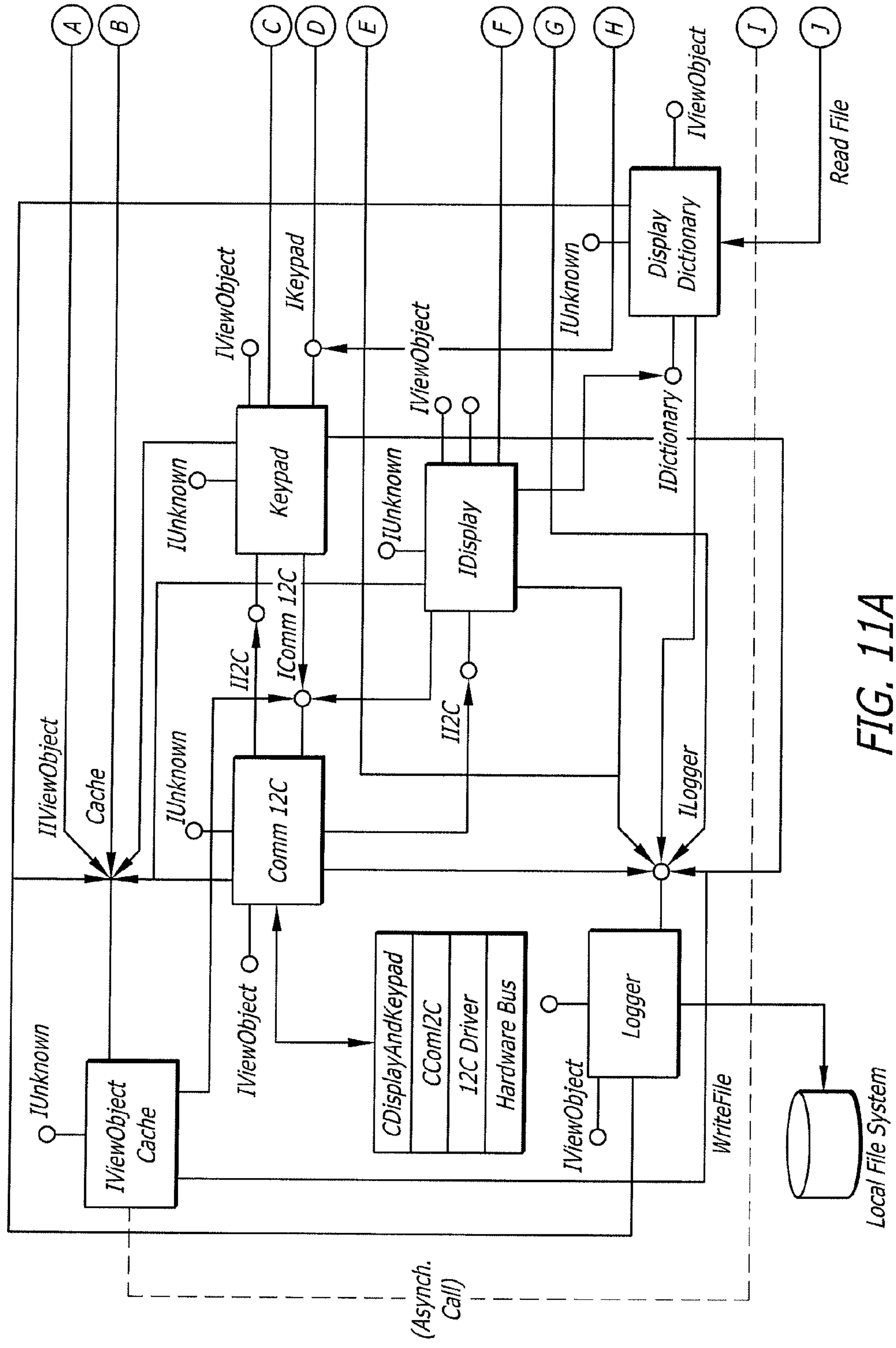
FIG. 11 illustrates an object interaction diagram of embedded additional user interface, constructed in accordance with the claimed invention.
Figure 11B:
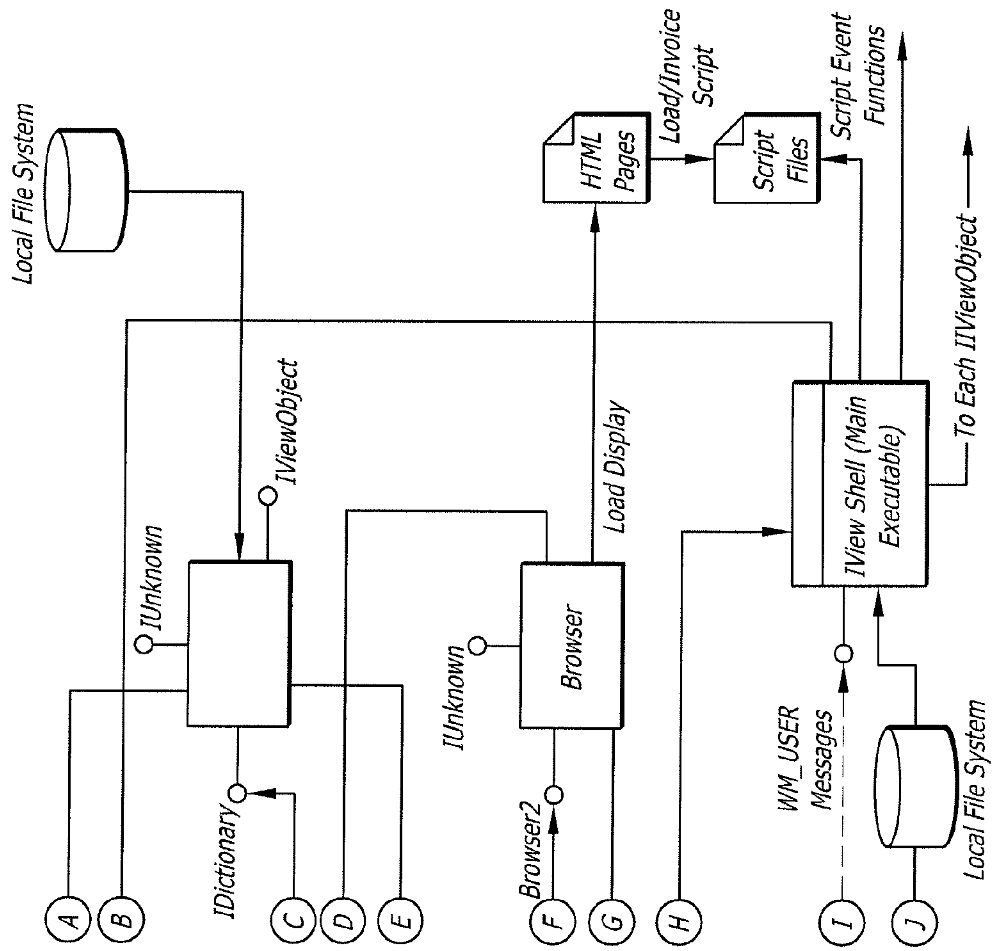
Figure 12:
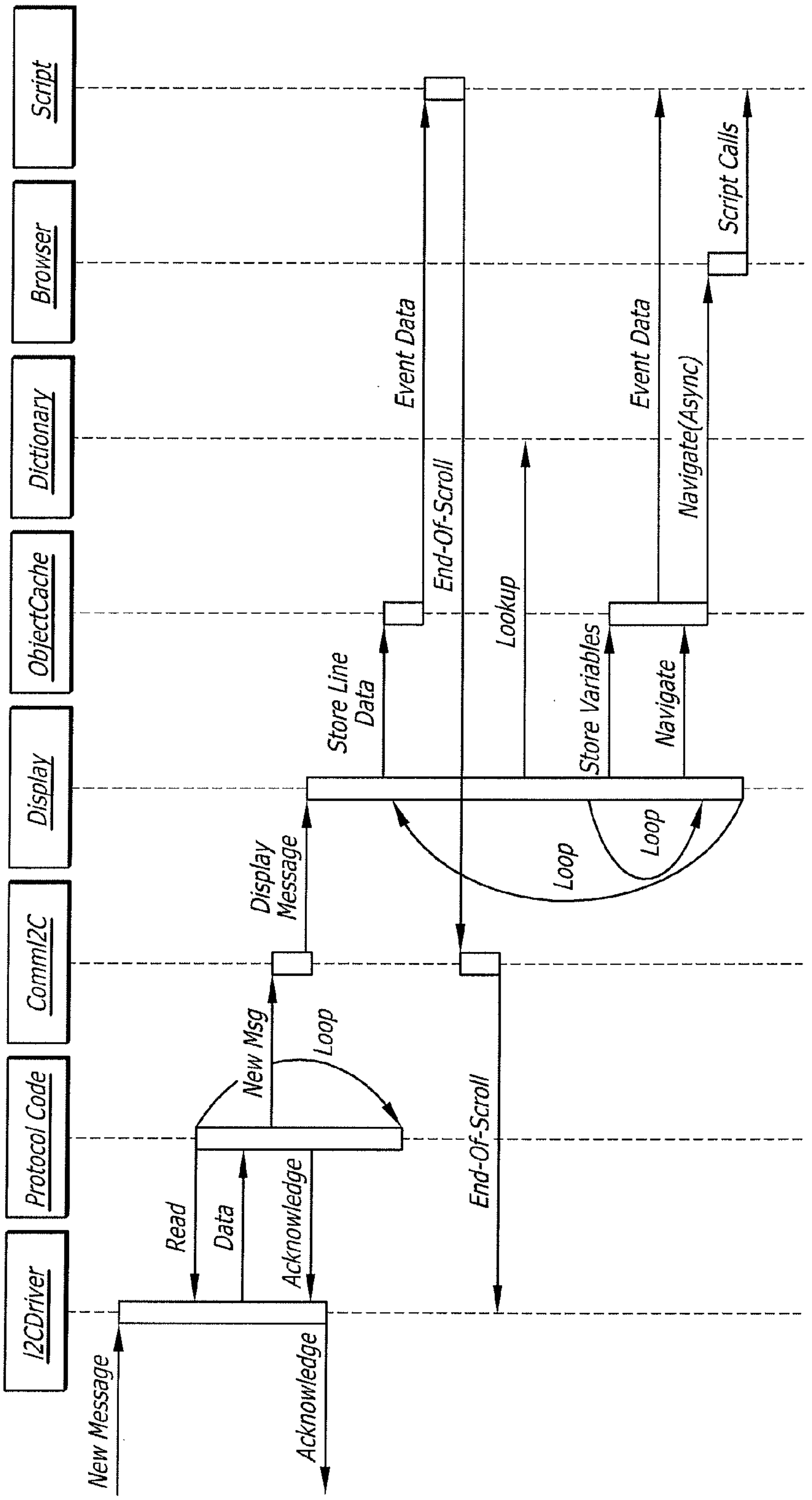
FIG. 12 is a diagram showing the sequence of events that occur when data is sent between the embedded additional user interface and the game monitoring unit.

With reference to FIGS. 11A and 11B, in one preferred embodiment of the invention, a dictionary URL approach is used for translating the data messages into web page information. In this manner, data messages are "looked up" in a dictionary data file where they can be redirected to an attractive URL. The embedded processor 330 responds to requests on the $I^2C$ bus that were intended for the prior art enhanced player interface (EPI) VF display. The web page display screen 320 is not a passive display device like traditional PC monitors, but rather the display screen 320 must respond to commands with text type responses. These requests include initialization requests, status requests, and display requests. With reference to FIG. 12, as each text data message to be displayed is passed into the embedded processor 330, the processor 330 calls a URL Dictionary to look up a URL with which to replace the text data message. Once the substitution is complete, the embedded processor 330 instructs the web page display screen 320 to present (or navigate to) the appropriate web page.

Figure 13:
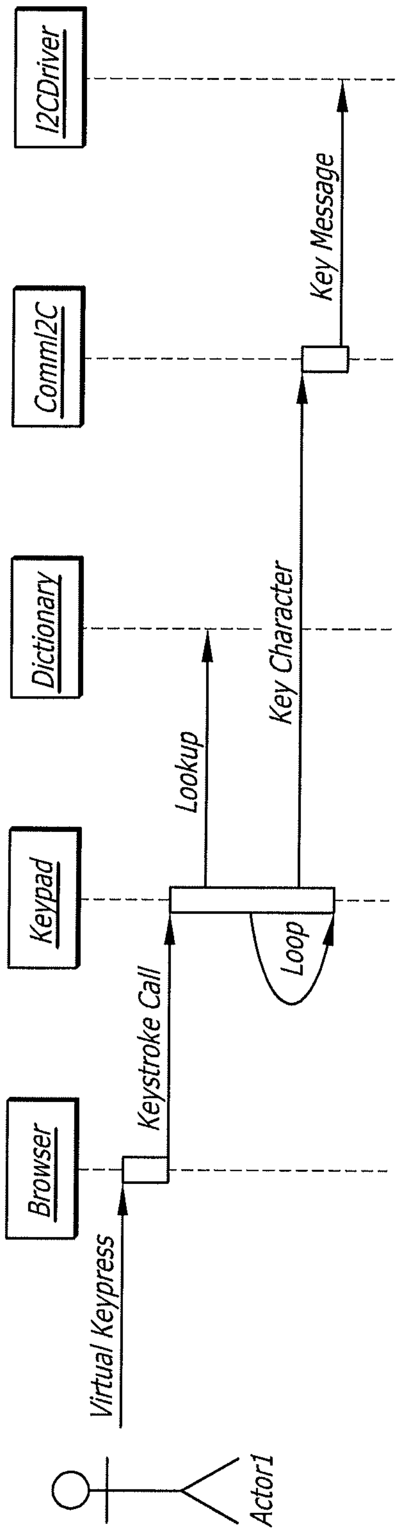
FIG. 13 is a diagram showing the sequence of events that occur when a virtual key is pressed on the web page display screen.

Accordingly, with reference to FIG. 13, a URL Dictionary component is used to map a text string, sent from the embedded processor 330 and intended for the display on the 2×20 VF display, to a URL that can be used to display a much more visually enhanced graphical representation of the same message. Thus, the URL Dictionary component contains a listing of the possible text messages to be supported that could be sent from the embedded processor 330, and a mapping to a set of the desired eye-catching, web content to be displayed on the web page display screen 320. In this event that a message is not in the URL Dictionary, such a message is mapping to a page that substitutes for the 2-line mode.

In the preferred embodiments described above, the embedded processor 330 of the embedded additional user interface 310 reads incoming $I^2C$ data messages, translates the $I^2C$ data messages into a web authoring language (e.g., HTML, DHTML, XML, MACROMEDIA FLASH), and maps the newly translated web page data message to the web page display screen 320. Additionally, the embedded additional user interface 310 can also read incoming data messages that are already in a web authoring language (e.g., HTML, DHTML, XML, MACROMEDIA FLASH), and map this web page data to the web page display screen 320. Further, and highly advantageously, a preferred embodiment of the invention also allows casinos that are using the embedded additional user interface 310 to design and use their own content, thereby giving the casinos the ability to decide what the web page presented on the web page display screen 320 of the user interface 310 will look like.

Figure 8:
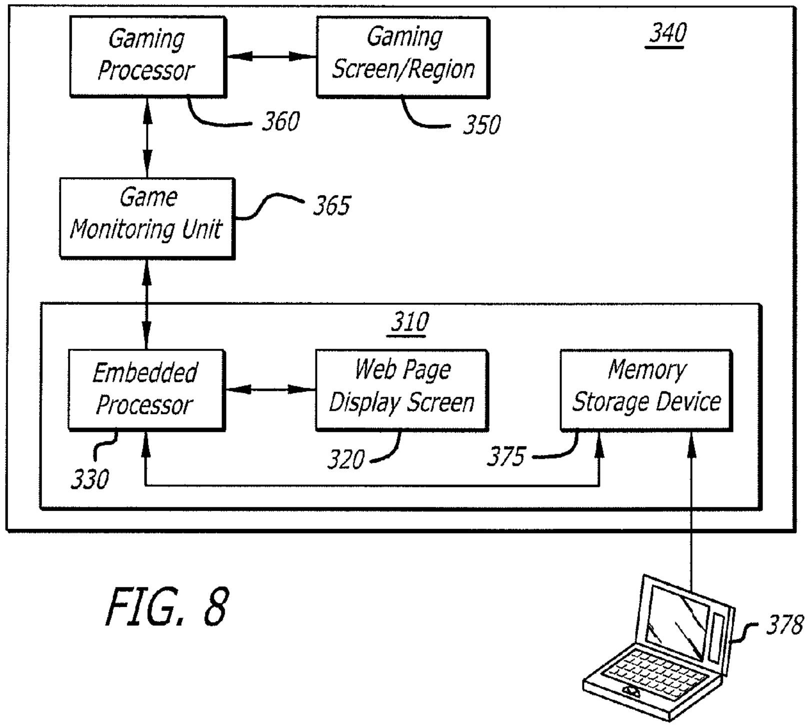
FIG. 8 illustrates a relational diagram of embedded additional user interface, constructed in accordance with the claimed invention, utilizing a web page display screen and an embedded processor that receives cryptographically certified web page content from a portable computer via a network adapter port.

Referring now to FIG. 8, in this preferred embodiment, content may be locally downloaded. Specifically, in one preferred embodiment, the content is updated through a physical USB (or other connection) that is used to download the new content. In one preferred embodiment, the data on the COMPACT FLASH® card 375 can be accessed by connecting a separate computer 378 to the network adapter port of the embedded additional user interface 310. This embodiment allows updating the contents of the operating system, changing the operating system itself, and receiving data from the COMPACT FLASH® card 375. Physical removal of the COMPACT FLASH® card 375 is also still an option for update and inspection of files on the embedded additional user interface 310.

In one preferred embodiment, a portable computer is used to store and publish data content to the COMPACT FLASH® card 375 on the embedded additional user interface 310, as well as to receive data from the COMPACT FLASH® card 375 on the embedded additional user interface. In this embodiment, all content on the embedded additional user interface 310 is authenticated as if it were a gaming machine.

In another preferred embodiment, a network adapter port is run on the embedded computer board of the user interface 310. This embodiment also includes a boot loader. Further, in this embodiment, the portable computer 378 (described above) includes components for use in uploading data to, and downloading data from, the COMPACT FLASH® card 375 on the embedded additional user interface 310. Specifically, the components that run on the portable computer 378 are for moving new data content to the embedded additional user interface 310, and for validation and verification of the data content that is on the embedded additional user interface. Preferably, all data that is used to update the COMPACT FLASH® card 375 moves to or from the embedded additional user interface 310 over the single built in network adapter port on the board.

Prior to the advent of the embedded additional user interface 310 of the invention, gaming regulators would have been unwilling to allow casino operators to design their own content. However, due to the cryptographic technology implemented by the embedded processor 330 in the embedded additional user interface 310, a certification process is provided by the invention with sufficient security for gaming regulators to allow casino operators to design their own content. Specifically, in one preferred embodiment, the certification process offered ensures authentication and non-repudiation of the casino operator designed web content. Preferably, in the invention the certification process provided further ensures auditability and traceability. Various cryptographic technologies, such as authentication and non-repudiation (described herein below), are utilized in preferred embodiments of the invention, to provide sufficient security for gaming regulators to allow casino operators to design their own content.

In one preferred embodiment, this certification process is used to certify "signed content" (created by the casino owners) in the same manner that a "signed program" is certified. Preferably, PKI (Public Key Infrastructure) is utilized in the certification process. PKI is a system of digital certificates, Certificate Authorities, and other registration authorities that verify authenticity and validity. In one preferred embodiment, a "new tier" or second PKI is created that is rooted in the primary PKI and that leverages the capabilities of the certificate (e.g., a x509 certificate) that allow for limited access. Thus, this preferred embodiment allows the attributes within the certificate are used to provide "levels" of code access and acceptance in the gaming industry.

In one embodiment, the content is protected by digital signature verification using DSA (Digital Signature Algorithm) or RSA (Rivest-Shamir-Adleman) technology. In this regard, the content is preferably protected using digital signature verification so that any unauthorized changes are easily identifiable. A digital signature is the digital equivalent of a handwritten signature in that it binds an individual's identity to a piece of information. A digital signature scheme typically consists of a signature creation algorithm and an associated verification algorithm. The digital signature creation algorithm is used to produce a digital signature. The digital signature verification algorithm is used to verify that a digital signature is authentic (i.e., that it was indeed created by the specified entity). In another embodiment, the content is protected using other suitable technology.

In one preferred embodiment, a Secure Hash Function-1 (SHA-1) is used to compute a 160-bit hash value from the data content or firmware contents. This 160-bit hash value, which is also called an abbreviated bit string, is then processed to create a signature of the game data using a one-way, private signature key technique, called Digital Signature Algorithm (DSA). The DSA uses a private key of a private key/public key pair, and randomly or pseudo-randomly generated integers, to produce a 320-bit signature of the 160-bit hash value of the data content or firmware contents. This signature is stored in the database in addition to the identification number. In other preferred embodiments, higher level Secure Hash Functions are used, such as SHA-256 or SHA-512.

In another preferred embodiment, the invention utilizes a Message Authentication Code (MAC). A Message Authentication Code is a specific type of message digest in which a secret key is included as part of the fingerprint. Whereas a normal digest consists of a hash (data), the MAC consists of a hash (key+data). Thus, a MAC is a bit string that is a function of both data (either plaintext or ciphertext) and a secret key. A Message Authentication Code is attached to data in order to allow data authentication. Further, a MAC may be used to simultaneously verify both the data integrity and the authenticity of a message. Typically, a Message Authentication Code (MAC) is a one-way hash function that takes as input both a symmetric key and some data. A symmetric-key algorithm is an algorithm for cryptography that uses the same cryptographic key to encrypt and decrypt the message.

A Message Authentication Code can be generated faster than using digital signature verification technology; however, a Message Authentication Code is not as robust as digital signature verification technology. Thus, when speed of processing is critical the use of a Message Authentication Code provides an advantage, because it can be created and stored more rapidly than digital signature verification technology.

In one preferred embodiment, the authentication technique utilized is a BKEY (electronic key) device. A BKEY is an electronic identifier that is tied to a particular individual. In this manner, any adding, accessing, or modification of content that is made using a BKEY for authentication is linked to the specific individual to which that BKEY is associated. Accordingly, an audit trail is thereby established for regulators and/or other entities that require this kind of data or system authentication.

Another preferred embodiment of the verification system utilizes "component bindings" for verification using cryptographic security. In component binding, some components come equipped with unalterable serial numbers. Additionally, components such as web content or the game cabinet may also be given another random identification number by the owner. Other components in the system, such as the CMOS memory in the motherboard, the hard drive, and the non-volatile RAM, are also issued random identification numbers. When all or some of these numbers are secured together collectively in a grouping, this protected grouping is referred to as a "binding." Each component of the machine contains its portion of the binding.

In one such preferred embodiment, every critical log entry made to the content is signed with a Hashed Message Authorization Code (HMAC) that is based on the entry itself, and on the individual binding codes. In this manner, the security produced by the bindings ensures that log entries that are made cannot be falsified or repudiated.

After the critical gaming and/or system components are selected, given individual identifiers, and combined into a protected grouping that is secured using the component "bindings," any changes to those components will then be detected, authorized, and logged. For example, content within the binding is digitally signed (SHA-1 or better) using the key derived from the bindings. This signature is verified whenever an entry is made to a component within the binding. If the signature is wrong, this security violation and the violator are noted, but typically the entry is not prohibited. In other embodiments, the entry may be prohibited as well. Thus, the component binding produces a cryptographic audit trail of the individuals making changes to any of the components within the binding.

Moreover, bindings ensure that the critical components of a gaming machine system, or the content utilized therein, that have been selected to be components within the binding have not been swapped or altered in an unauthorized manner. Preferably, bindings use unique identification numbers that are assigned to vital parts of the gaming platform including, by way of example only, and not by way of limitation, the cabinet, motherboard, specific software, non-volatile RAM card, content (data), and hard drive. These identification numbers combine in a cryptographic manner to form a "binding" that protects and virtually encloses the included components, such that no component within the binding can be modified, removed, or replaced without creating an audit trail and requiring authentication. Thus, for one of these components within the binding to be changed, appropriate authentication is required and a log file entry is made documenting the activity and the identity of the individual making the change. In one preferred embodiment, a specific level of BKEY clearance or classification is required to make specific changes.

Figure 9:
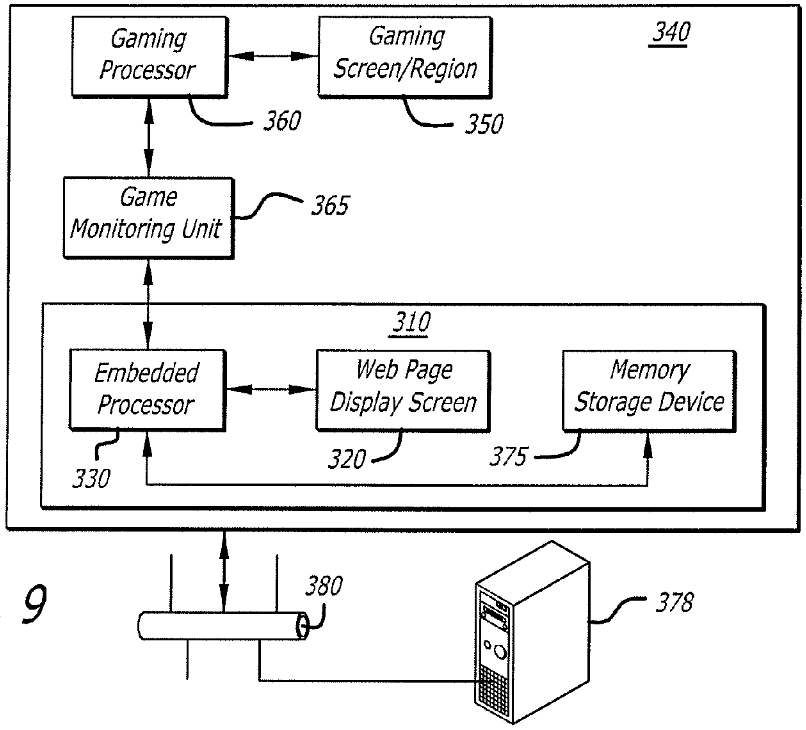
FIG. 9 illustrates a relational diagram of embedded additional user interface, constructed in accordance with the claimed invention, utilizing a web page display screen and an embedded processor that receives web page content from a back-end server via an Ethernet-networked backbone.

Referring now to FIG. 9, in one preferred embodiment, the embedded additional user interface 310 connects to an Ethernet-networked backbone 380 instead of a local system network. Currently, casino networks are not Ethernet, but rather are smaller, more simplistic local system networks. Thus, in this Ethernet-networked backbone 380 embodiment, the current system network is replaced by an industry standard Ethernet backbone, such as 10/100 base T Ethernet running over Cat 3, 4, 5, 6, or higher. Thus, a standard 10/100 base T Ethernet card is added to the processor in this embodiment. Preferably, the network employs TCP/IP, HTTP, and XML messaging or a variant of XML. Nevertheless any suitable protocol may be used.

Further, in another preferred embodiment, the embedded additional user interface 310 connects to a full featured, back end, download configuration server 390 through the above-described Ethernet-networked backbone 380 as shown in FIG. 9. In such an embodiment, the full-featured server 390 can schedule downloads of content (gaming or otherwise) as well as upload information from the gaming machines 340, such as what options the gaming machines 340 currently possess. Accordingly, in a preferred embodiment, the primary use of the server 390 is as data download and data retrieval server. While this server 390 does upload and download web content style information, it is typically not connected to the World Wide Web.

This server 390 must be authenticated (just like a gaming machine) to make the content served to the embedded additional user interface 310 acceptable to the gaming regulators. Preferably, utilization of the Ethernet-networked backbone 380 and the server 390 provides many system benefits, including but not limited to reliability, maintainability, security, content staging, content testing, deployment procedures, and incident recovery. In one embodiment, deliverables also preferably include content templates and guidelines for casino owners and operators to create their own web content for deployment to the web server. In one embodiment, the web server 390 has its content authenticated in the same manner as the embedded additional user interface 310 to allow content to be downloaded to the web page display screen 320.

Figure 10:
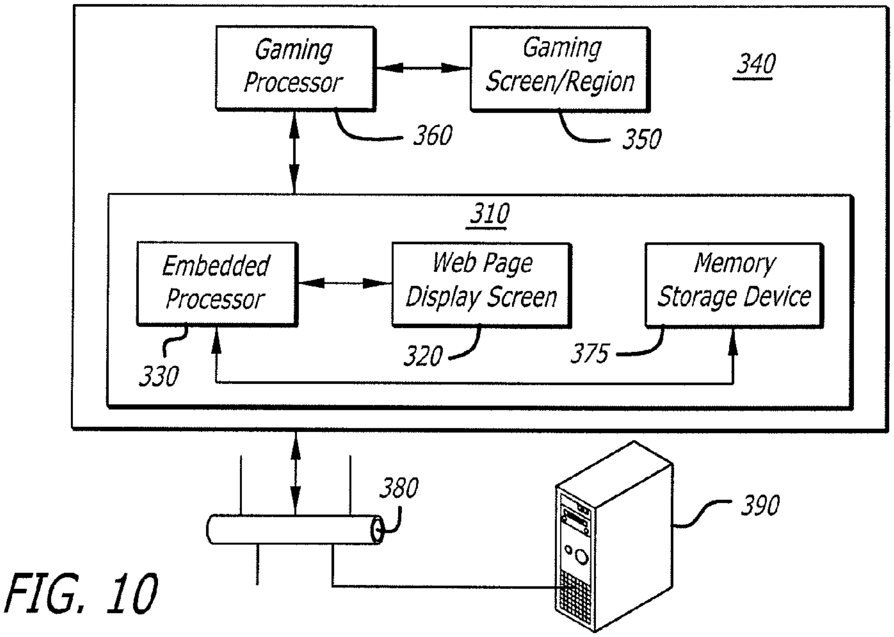
FIG. 10 illustrates a relational diagram of an embedded additional user interface, constructed in accordance with the claimed invention, utilizing a web page display screen and an embedded processor that includes the functionality of a standard gaming processor.

Referring now to FIG. 10, in another preferred embodiment of the invention, the functions previously performed by the gaming monitoring unit 365, as shown in FIGS. 6-9, of the gaming machine 340 are supported by the embedded processor 330 of the embedded additional user interface 310. Otherwise stated, the GMU code is transitioned from the gaming monitoring unit 365 into the embedded processor 330 in the embedded additional user interface 310. Accordingly, such a configuration removes the need for the gaming monitoring unit 365 in the gaming machine 340. This results in a significant reduction in the amount and complexity of the hardware, as well as completing a phased transition of more traditional style gaming machines into more modernized upgraded gaming machines.

Thus, in such a preferred embodiment, the invention is directed towards an embedded additional user interface 310 that is incorporated into a gaming machine 330, the gaming machine in turn including a gaming screen 350 or other appropriate gaming region (e.g., spinning reels), but does not include a gaming monitoring unit 365. Such an embedded additional user interface 310 still includes a web content capable display screen 320 and an embedded processor 330. Once again, the web content capable display screen 320 presents web information to a user via the display screen. The embedded processor 330 preferably utilizes an internal operating system. Furthermore, in this embodiment the embedded processor 330 additionally includes standard gaming monitoring unit functionality (GMU code), since it replaces the gaming monitoring unit 365 in the gaming machine 340. As before, the embedded processor 330 reads incoming data, translates the data into a web protocol (web authoring language), if necessary, and maps the data to the web content capable display screen 320.

In one embodiment, the embedded additional user interface 310, the messages are flashed (e.g., animation, multimedia, and the like) to the player within the web page display screen 320 while the gaming screen 350 is used for game play. These web page style messages can be set at virtually any desired length, format, or style. A message might display, for example, "Welcome to Harrah's Las Vegas! You have 1200 bonus points. Would you like to make a hotel or dinner reservation?" Importantly, while a previous utilized EPI would only been capable of scrolling this message in one-quarter inch (0.25") tall monochrome text, in contrast, the web page display screen 20 would "flash" this message in bright red, white, black, and green animated format, on six inch (6.0") by three inch (3.0") color graphic display. Additionally, in some embodiments, inserting a player identification card into a card reader and/or selecting a player services button activates additional player services functionality.

In one exemplary embodiment of the embedded additional user interface 310 that utilizes a card reader (or other identification technique, such as a player ID code) to recognize a particular player, the web page display screen 320 displays an eye-catching, web page-style message to that player, for example, "Welcome, Mr. Smith!" in response to identifying Mr. Smith. Preferably, the web page display screen 320 also has touch screen capabilities that include, by way of example only, and not by way of limitation, "Beverages," "Change," "Services," "Transactions," and "Return to Game." In one embodiment, each of the touch screen icon buttons, when selected, launches a new full screen display within the web page display screen 320 for the player.

For example, in one embodiment, when the "Transactions" touch screen icon button is selected, a new screen is activated that includes the web page style message, "Mr. Smith, Account Balance: Bonus Points=1200, Player Funds=$150, Available Credit=$850, Casino Matching Funds Available=$25," as well as the "Return to Game" icon button. As a further example, when the player selects a "Cashless Withdrawal" button in another embodiment, a new screen is activated that includes a touch screen keypad and flashes the question, "How much do you want?" as well as "Enter," "Clear," and "Back" buttons. Preferably, this interface also includes an "Information" button that, when selected, launches a new screen within the web page display screen 320 that provides answers to frequently asked questions and other useful information. Moreover, the web page display screen 320 preferably also includes a "History" button that, when selected, launches a new screen within the web page display screen 320 that provides a history log of all transactions and other actions performed on that gaming machine 340.

In accordance with another preferred embodiment, the invention is directed towards a method for increasing user excitement relating to a gaming machine by providing a richer gaming experience via an embedded additional user interface that is incorporated into the gaming machine. The method preferably includes: receiving a serial data message (e.g., an $I^2C$ data message) containing enhanced player information over a serial communication bus (e.g., an $I^2C$) bus in the embedded additional user interface 310; translating the data message (using the embedded processor 330) into a web authoring language; and mapping the data message to the web page display screen 320, wherein the display screen presents web page information to a user via the display screen.

The potential advantages of utilizing the embedded additional user interface 310 of the invention are numerous. These potential advantages include, by way of example only, and not by way of limitation: providing animated and/or multimedia web style content; providing fonts and icons which are larger and more aesthetically appealing; providing special services to players, (e.g., multiple languages, assistance for handicapped individuals); facilitating interactive uses of the web page display screen 320; providing the ability to customize the "look and feel" of the web page display screen 320 for players and casino employees; increased player excitement and participation; and simplified replaceability and/or upgradeability from an EPI or other similar non-web page style components.

Generally, player tracking systems have long been limited to small displays and fairly generic sound capabilities. However, it is desirable to incorporate a wide variety of output (and potentially input) devices into a player tracking system. Additionally, promotional system-based games are relatively new, and have thus far been limited to video presentations on fairly small screens. It would be advantageous to produce a device and/or system that would enable a player tracking system and/or a promotional system game to utilize larger gaming presentations or other peripheral devices 440.

Figure 14:
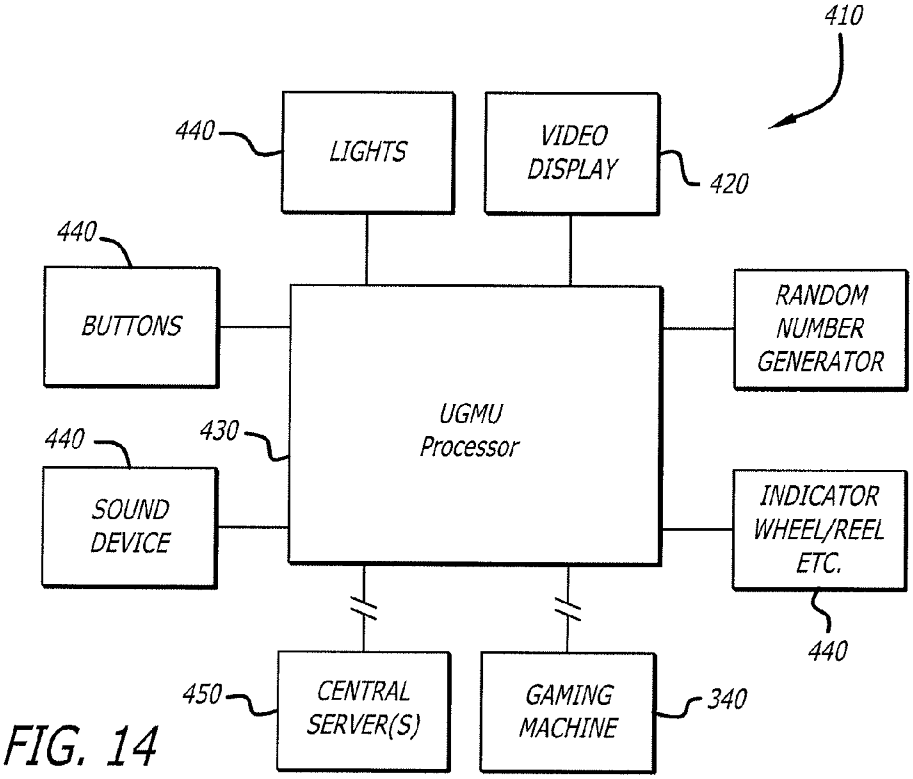
FIG. 14 illustrates a universal game monitoring unit that incorporates a display screen and an expanded display device controller that communicates with a game processor, one or more peripheral display devices, and one or more back-end systems.

In this regard, with respect to another aspect of the invention, FIG. 14 illustrates a preferred embodiment of a universal game monitoring unit 410 (which includes both GMU 365 and an iView 310 functionality, and is built upon a GDCU 10 architecture) incorporates a display screen 420 and an UGMU processor 430 (e.g. expanded display device controller) that communicates with a game processor 360 in a gaming machine 340, one or more peripheral display devices 440, and one or more back-end systems 450. In some preferred embodiments, the display screen 420 is an interactive touchscreen that is capable of both displaying and receiving information to and from a player. A preferred embodiment of the universal game monitoring unit 410 (UGMU) enables a system-based iView 310 game to not be limited to game play inside the iView itself, but rather to enable the use of peripheral devices 440 and systems 450 outside of the iView component. In some preferred embodiments, the display screen 420 is not incorporated into the universal game monitoring unit 410, but rather is one another one of the peripheral display devices 440 that are connected to, and associated with, the universal game monitoring unit.

In some preferred embodiment, the universal game monitoring unit 410 employs programming and an operating system that enables the UGMU to expand beyond the function of a traditional GMU 365 to include system-game features, including by way of example only, and not by way of limitation: (1) driving a graphic display (e.g., a video screen) for presentation of a game to casino patrons; (2) driving mechanical reels (or other mechanical game presentation components) over an interface, such a USB; or (3) driving other gaming peripheral devices 440 (e.g., coin acceptor, bill acceptor, hopper, printer and the like).

In this regard, a universal game monitoring unit 410 can be used to enable several different kinds of functionality, including by way of example only, and not by way of limitation: (1) an external system game controller (i.e., controls the outcome of an external (to the UGMU/iView) "pay to play" system game), (2) an external system "expanded primary pay indicator" controller (i.e., controls the display of an external "pay to play" system prize), (3) an external "promotional" system prize display controller (i.e., controls the display of an external "promotional" system prize), and (4) a non-game related, system information display controller (i.e., controls the display of external non-game related information).

In one preferred embodiment of the invention, the universal game monitoring unit 410 includes a player tracking system and attention-grabbing color animation that are provided on the traditional small graphics display screen 420. In addition to creating a more compelling presentation, the universal game monitoring unit 410 has the potential sales advantage of necessitating additional hardware to support the deployment of these premium player-tracking systems. Furthermore, many payout indicators and peripheral devices 440 (e.g., wheels, reels, lights, buttons, card readers, and the like) can be connected to the UGMU processor 430 (expanded display device controller) of the universal game monitoring unit 410 at the gaming machine 340 for presentation by the player tracking system of the UGMU 410. Additionally, as described above, in some preferred embodiments, the display screen 420 is actually a peripheral device 440 that is connected to, and associated with, the universal game monitoring unit 410 instead of being incorporated into the UGMU itself.

Figure 15:
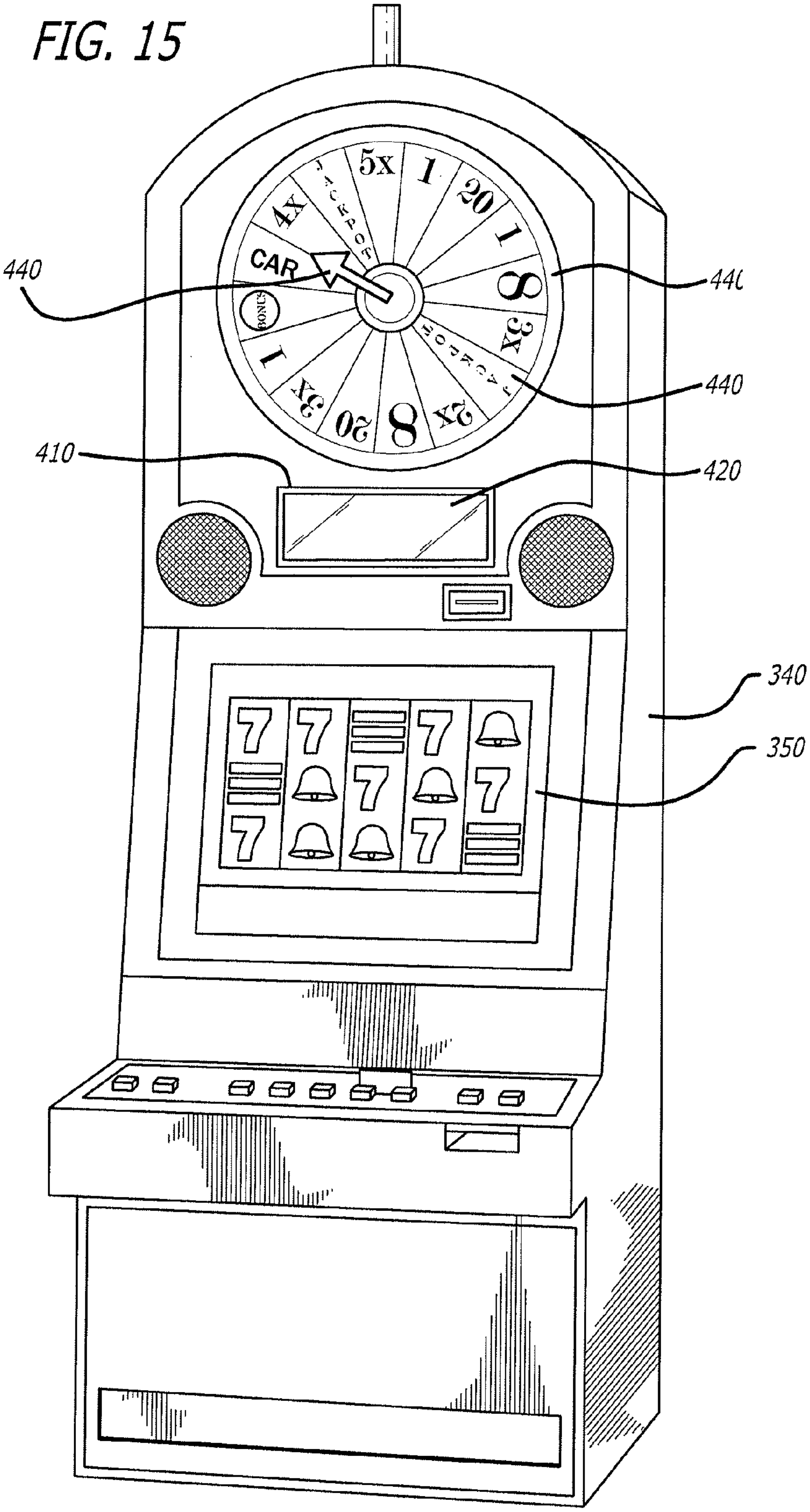
FIG. 15 illustrates a universal game monitoring unit that enables control of an system game indicator that is physically external to the embedded user interface.

Accordingly, any presentation device or other peripheral devices 440 that can be driven directly or indirectly (using a peripheral controller such as a reel control unit (RCU)) can be controlled by the universal game monitoring unit 410. Specifically, these peripheral devices 440, which are external to the UGMU (and included iView) device 410, that are controllable by the universal game monitoring unit include, by way of example only, and not by way of limitation: reels, wheels, light wheels, lights, meters, sliding indicators, rotating pointers, sound devices, and the like (i.e., anything that can be controlled directly by a player tracking system-based game computer or can be controlled indirectly by a controller attached thereto). In this regard, peripheral devices 440 can be anything used for the display of primary or secondary system-based game outcomes, such as the expanded primary pay indicator shown in FIG. 15.

Referring again to FIG. 15, one peripheral device 440 that is controllable by the UGMU controller 430 of the universal game monitoring unit 410 is a Monte Carlo-style wheel (or other similar wheel display). In this specific, non-limiting example, a Monte Carlo-style wheel controller is attached to the UGMU controller 430 of the universal game monitoring unit 410 using a USB, serial port, or other appropriate interface. Using this configuration, a system-based Monte Carlo reel spinning game can be played on the UGMU display screen 420 (which is now the iView screen), thereby enabling the wheel device to be spun, as needed, to enhance player appeal. By utilizing the universal game monitoring unit 410 in this manner, any popular game (e.g., the Bally Monte Carlo game) can now be made available on any gaming machine 340 in a casino, regardless of the base game and the manufacturer of the base game. This dramatically increases the variety and proliferation of game themes available across a casino floor, as well as breaking down barriers created by competing game manufacturers.

Figure 16:
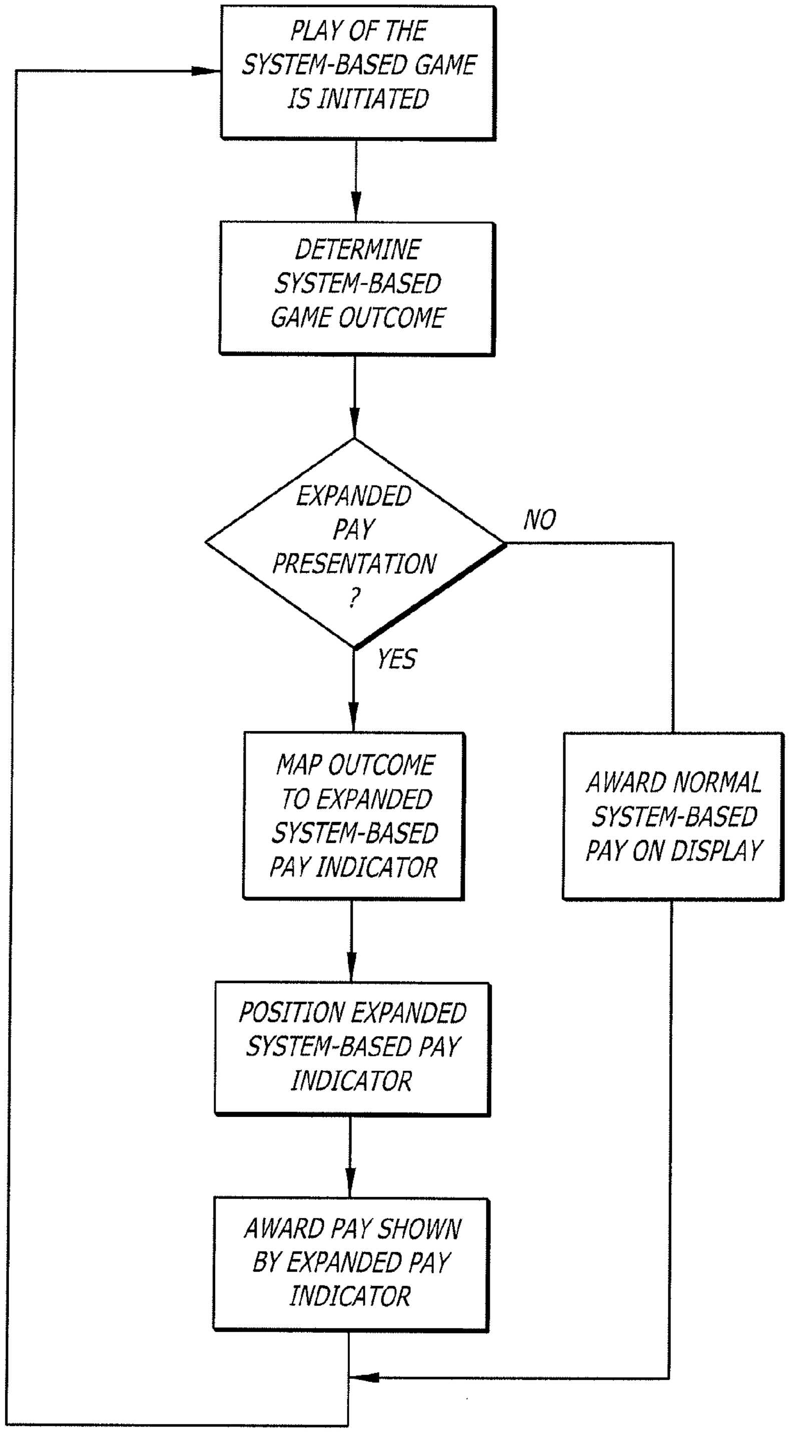
FIG. 16 is a logical flow diagram showing the gaming process for a system-based game that utilizes an expanded pay presentation controlled by a universal game monitoring unit.

As described above, a peripheral device 440 such as a Monte Carlo-style wheel (or other similar wheel display) can be used (1) as the sole presentation for system-based game ohutcomes, (2) as a traditional "bonus" device (e.g. Monte Carlo) or (3) as an expanded primary pay indicator for a system-based game. In this regard, FIG. 16 illustrates how a peripheral device 440, such as the shown in FIG. 15, may be implemented as an expanded primary pay indicator. More specifically, FIG. 16 is a logical flow diagram showing the gaming process for a system-based game that utilizes an expanded pay presentation controlled by a universal game monitoring unit 410.

Referring again to FIG. 14, in another preferred embodiment of the universal game monitoring unit 410, devices can be used for other than system-based game presentation. Otherwise stated, the universal game monitoring unit 410 can be used for any kind of system information presentation (e.g., awarding a mystery bonus by moving a pointer to a dinner, a show, or a room.). Thus, the award does not have to be strictly part of a game, but rather simply be system-based.

Furthermore, in another aspect of a preferred embodiment, the universal game monitoring unit 410 presents different "messages" from the UGMU computer (e.g., messages that are not limited to system-based game outcomes) when the casino wants some information to have a more dramatic effect than that achievable by the traditional small display screen. In one specific, non-limiting example, participation in the game by a "gold" player would illuminate a representation of a candle that was viewable by a slot host. In essence, the universal game monitoring unit 410 is transformed into an extension of a browser. In another example, a player that acquires a certain number of session points turns on a lights, ring a bell, or receives some kind of award.

In one preferred embodiment, the universal game monitoring unit 410 can be built from a PC-based processing engine combined with a gaming baseboard. Thus, any advantages related to production capacity and/or technology advancements from the PC industry can be leveraged by the universal game monitoring unit 410. Additionally, due to the capabilities of the universal game monitoring unit 410, it is advantageous (but not required) to attach a gaming baseboard to the standard PC processing engine.

In some embodiments, the gaming baseboard is designed for minimal cost and function then upgraded at a later date to provide higher features and benefits. Preferably, the gaming baseboard is customizable to allow for compatibility with older systems and games, while yet providing hardware interfaces for upgrading to newer networking standards such as Ethernet.

In one preferred embodiment, universal game monitoring unit 410 is constructed using an ETX module form factor single board computer, which is available from numerous vendors including Kontron and Axiomtek. This module includes the core processing functions of a PC combined with standard physical size and connector pinouts. Thus, the device gains flexibility in procurement. The ETX module also has a very small physical footprint, which provides advantages for a device such as a universal game monitoring unit 410 which needs to fit into slot machines which are produced by multiple manufacturers. As such, small physical size is advantageous. Moreover, low power consumption and the need for only a single source power voltage are also advantageous.

Additionally, the ETX module is compatible with a broad range of operating systems: proprietary, LINUX®, WINDOWS® CE and WINDOWS® XP, which provides for greater flexibility in programming and deployment. Continuing, since ETX modules share a common footprint and have similar power operating requirements, the task of upgrading from a lower cost ETX module to one of much greater processing power is greatly simplified. Such an upgrade might be necessitated as new features such as system-games are added, which require greater processing power, after basic units have been initially sold into the market.

In one preferred embodiment, universal game monitoring unit 410 can be designed to accommodate legacy connections to user interface components with the proper baseboard design. Such components may include keypad, card reader and two-line display. The universal game monitoring unit 410 may also be configured to connect to VGA, XGA, or better graphics displays, as well as touchscreens over a LVDS cable driven circuit. In this manner, the universal game monitoring unit 410 enables user interface components to be remotely located from the UGMU processing device 420.

In various alternate preferred embodiments, the universal game monitoring unit 410 may be housed in multiple ways, including by way of example only, and not by way of limitation: (1) as a stand-alone device; (2) attached to the user interface equipment, as a video, network, and game processing device (thereby leaving GMU processing to a secondary device); or (3) as both a GMU and gaming device with remote connection capability to the user interface components (i.e., a long cable to the touchscreen and keypad).

Referring now to FIGS. 17-21, another aspect of a preferred embodiment is directed towards a system and method for tracking the game play of customers, as well as providing other marketing and gaming functions on a network of gaming devices that do not have inherent support for player tracking functions. Such an embodiment of the universal game monitoring unit 410 enables the above described functionality to be achieved without making changes in the approved software of the existing gaming devices. This is of material value to the operators of such networks, and is accomplished by using a system-to-system interface that enables more rapid and economical implementation of such a player tracking system than would be possible using more traditional techniques.

Figure 17:
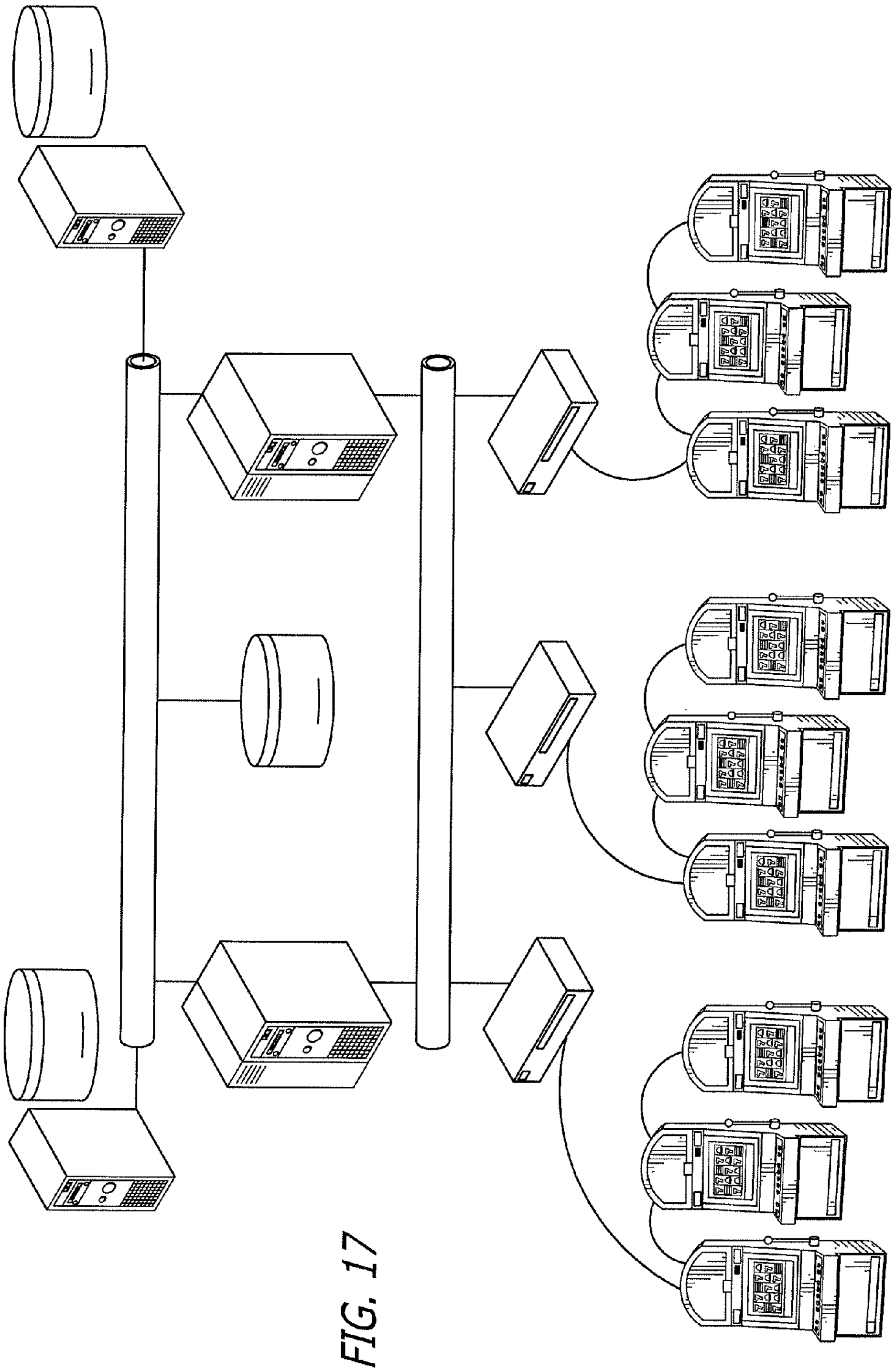
FIG. 17 illustrates a gaming system that connects gaming devices through networking equipment to a backend computer system that provides control and accounting functions.
Figure 18:
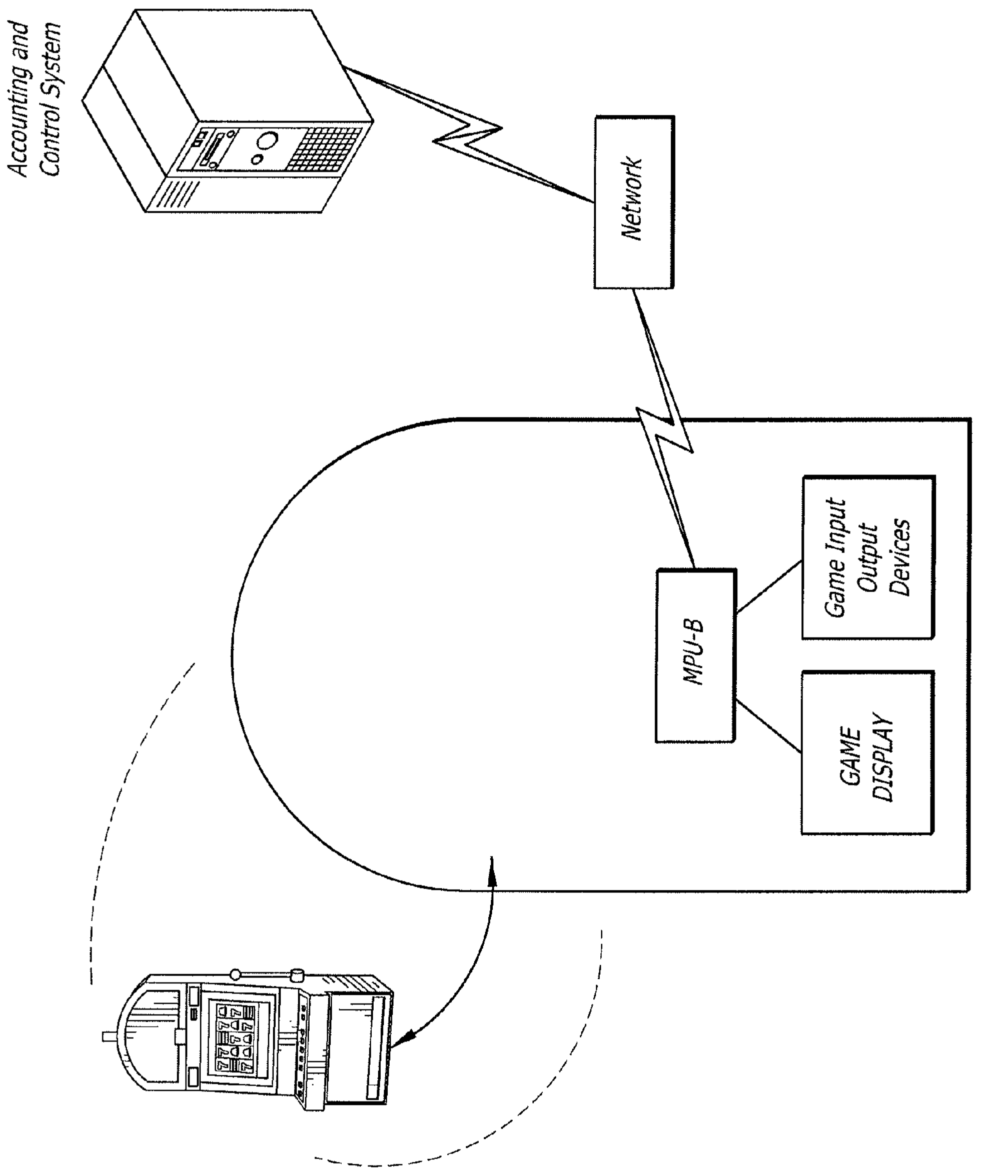
FIG. 18 illustrates a traditional gaming system that includes a gaming device networked to an account and control system server, wherein the gaming system does not include a player tracking system or a game monitoring unit (GMU)
Figure 19:
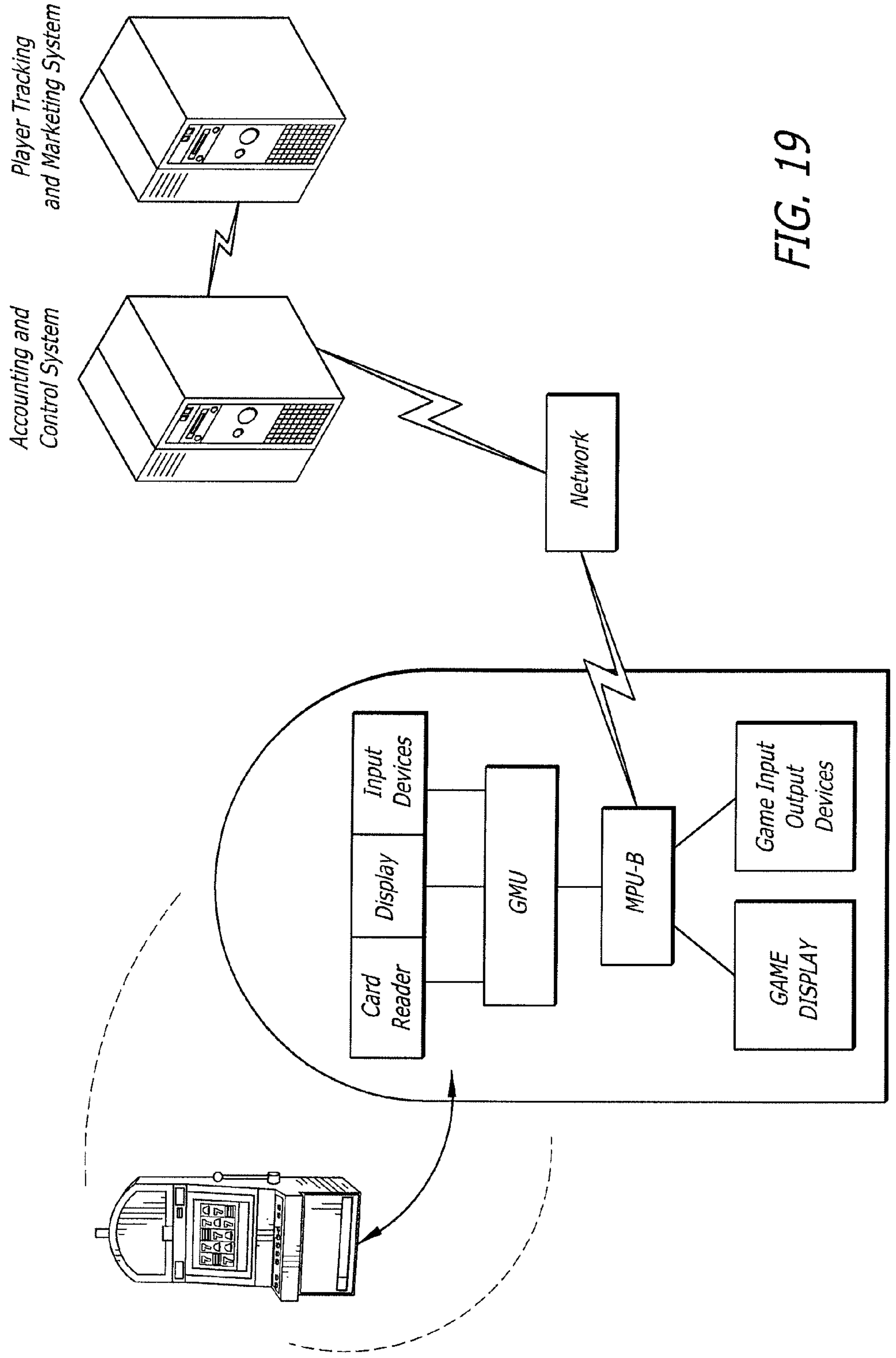
FIG. 19 illustrates a traditional gaming system that includes a gaming device networked to an accounting and control system server and a player tracking system server, wherein the gaming devices use a game monitoring unit to collect accounting and other information from the game main processing unit and to provide player tracking capability.

In this regard, FIG. 17 shows a gaming system that is well known in the art, which connects gaming devices through networking equipment to backend computer systems that provide control and accounting functions. Specifically, FIG. 18 shows a traditional gaming system that includes a gaming device networked to an accounting and control system server, and in which the gaming system does not include a player tracking system or a game monitoring unit (GMU). However, player tracking systems have since become desirable and relatively common after a time when configurations such as that shown in FIG. 18 were the standard. Therefore, new system configurations were needed that would incorporate player tracking functionality. Accordingly, FIG. 19 illustrates a traditional gaming system that includes a gaming device networked to both an accounting and control system server and a player tracking system server. Continuing, in this configuration the gaming devices use a game monitoring unit to collect accounting and other information from the game main processing unit and to provide player tracking capability.

Figure 20:
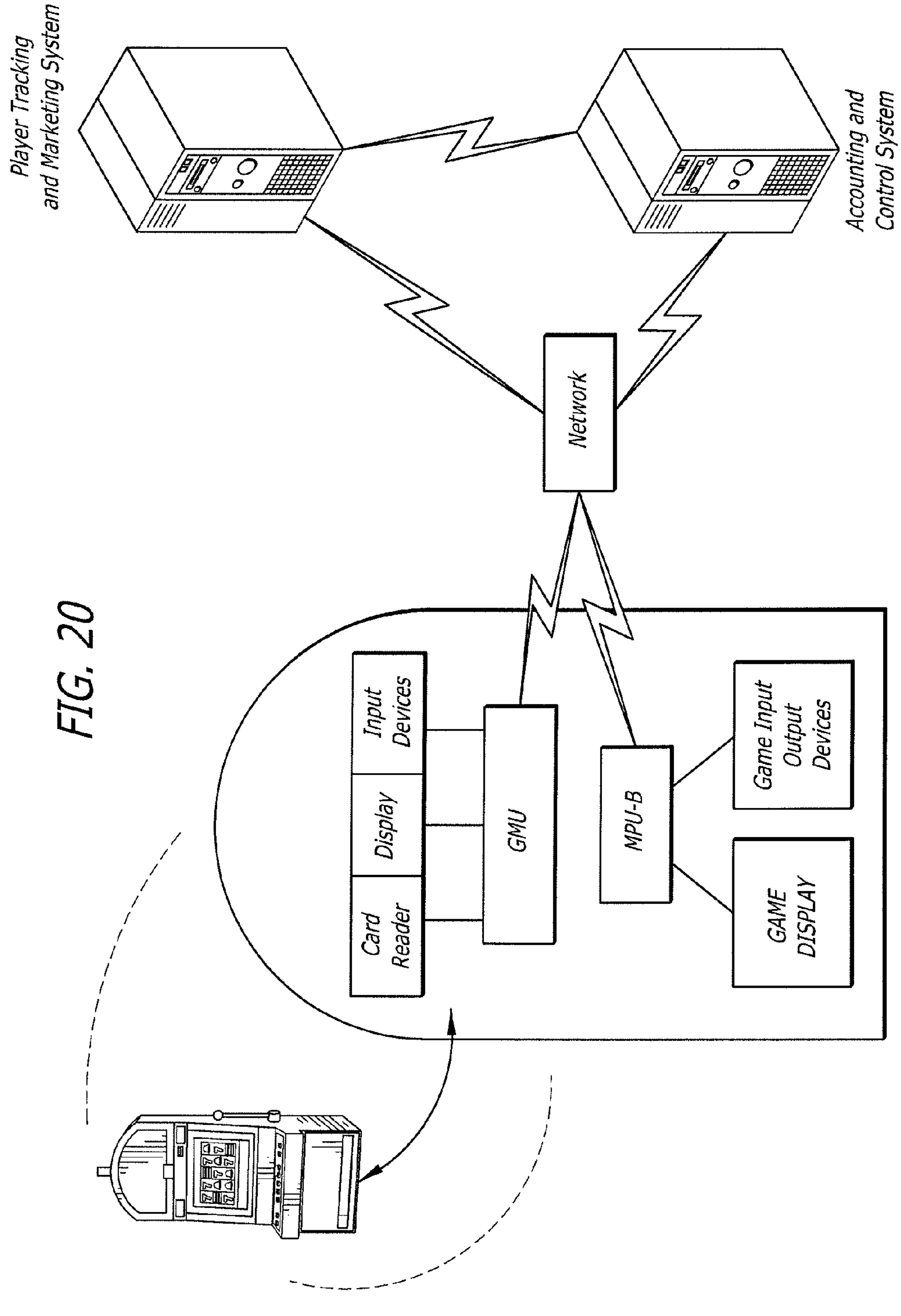
FIG. 20 illustrates a novel gaming system that includes a gaming device networked to an accounting and control system server and a player tracking system server, wherein the gaming devices include a game monitoring unit and a master processing unit (MPU) that are each independently connected to a gaming network that is in turn independently connected to the accounting and control system server and to the player tracking system server.

In this regard, a preferred embodiment of the universal game monitoring unit 410 provides a mechanism for implementing a player tracking system with a wide array of potential marketing and game enhancing features. The universal game monitoring unit 410 can be implemented in any type of environment where a system gathers game play data from gaming devices without requiring any software modifications to the gaming devices themselves. Referring now to FIG. 20, a novel gaming system is illustrated that includes a gaming device networked to an accounting and control system server and a player tracking system server. In this embodiment, the gaming device includes a game monitoring unit and a game processor (e.g., a master processing unit (MPU)) that are each independently connected to a gaming network that is in turn independently connected to the accounting and control system server and to the player tracking system server. In this embodiment, there is not direct connection between the game monitoring unit and a master processing unit. Such a connection would require the software modifications to the gaming devices modifications referenced above.

As shown in FIG. 20, in one preferred embodiment, the universal game monitoring unit uses a separate processing element from the master processing unit (MPU). The peripherals in the gaming device communicate with a central computer system. In this embodiment, the universal game monitoring unit 410 is co-resident in the gaming device with the main processing unit, but is electrically and logically independent of that unit. All necessary exchange of data occurs via the central computer.

In a traditional casino system, such as the system shown in FIG. 19, a game monitoring unit (e.g., a game monitoring unit (GMU)) or other player tracking device communicates with both a central computer, (such as the Slot Data System, produced by Bally Gaming and Systems) and a game processor. In this traditional configuration, the game processor is resident in the gaming cabinet and the central computer is in a remote location (possibly, but not necessarily in the same building). When a player inserts a player tracking card into the gaming device, a signal is sent to the GMU. The GMU communicates with the game processor (using a communications protocol, (e.g., Slot Accounting System®)) to gather the state of the "meters" that record the activity level of the machine. The meter information is appended to the identification information read from the card and a message containing at least that data is sent to the central system, where it is recorded in a database for future use.

Continuing, in such a traditional configuration, when a user plays games the gaming machine, the main processor updates the "meters" to record changes in the amount of play, amount of wins, and other specific information which may contribute to the characterization of the play. Additionally, the processor may notify the central computer when a threshold is reached or other marketing information is detected. When the user ceases playing, the user typically removes the player tracking card from the machine. This causes a signal to be sent to the game monitoring unit which again determines the updated meter readings for the gaming device and sends a message to the central system that indicates that the player's card has been removed. Additionally, updated meter information is attached. In some embodiments, information on the player's activity during the play session is sent as well as, or alternatively to, the meter information. In this regard, the game play information is generally recorded in the system database and used for an array of marketing functions.

In contrast, in a system configuration that implements a preferred embodiment of the universal game monitoring unit 410 (e.g., FIG. 20), there is no direct communication between the universal game monitoring unit 410 and the game processor, yet equivalent functionality is obtained. Instead, the universal game monitoring unit 410 utilizes the central system, which has access to real-time game play information. Preferably, this information is collected in real-time (i.e., approximately once per play period—about 5 seconds). This data collection rate coincides with the collection rate of "high speed" networks (e.g., Ethernet and the like). Referring now to FIG. 20, in another aspect of a preferred embodiment, a real-time Application Program Interface (API) is utilized that enables a player tracking and marketing server to access game play information. This can be done at a particular machine by querying the central computer, such as an accounting and control system computer.

Generally stated, a preferred embodiment of the universal game monitoring unit 410 is directed towards adapting gaming network that does not have player tracking to include those capabilities without requiring software changes in the individual gaming devices. In one embodiment, as shown in FIG. 17, gaming devices are interconnected via a local communication network. In this embodiment, the network can adopt many methodologies, depending on the designer and installer of the system. It may be one of several forms of serial networks, such as a hub arrangement or, more typically, a multi-drop polled system. Alternatively, the network may be an Ethernet link using Internet Protocol (an IP network). The network is to enables bi-directional communication between a multiplicity of gaming devices and a central computer, either directly, or through the use of a local concentration device. In some embodiments, a local concentration device may take the form of a general purpose computer or a proprietary device developed by a supplier to perform communications functions and, in some cases, ancillary functions, such as encryption, ticket validation, report generation and other operations functions.

The gaming devices are utilized by customers to play many different types of games (e.g., games of chance and/or skill). Their play and winnings are monitored by the game processor in the gaming device, and the information is posted in a timely fashion (e.g., within 10 seconds) to the accounting and control system. That cycle of operation is typical of many systems in operation today. The game machines may play many types of games, including by way of example only, and not by way of limitation: traditional casino style games with mechanical, electro-mechanical or video reels, poker games, video games with bonus modes or bonus devices, bingo-based games, central determination games, or various skill games. Prizes may range from small to progressive games with very large jackpots that accumulate over play from games at many locations.

Referring again to FIG. 20, in a preferred embodiment, a universal game monitoring unit may be installed within, attached to, or in close proximity to the gaming machine. The universal game monitoring unit enables the recording of customer game play at gaming devices in a gaming network. The game play data is used for marketing purposes and also can provide a wide array of game enhancing functions, including by way of example only, and not by way of limitation: advertising, free giveaways, bonus games, promotions, and any other action that requires an interactive point-of-sale experience for the player. The universal game monitoring unit is capable of controlling of array of peripherals devices, including one of many types of player identification devices. These include read magnetic striped card readers, smart card readers, biometric identifiers, radio frequency identification devices (RFID), and any other device that is machine readable and provides an identifying token (which can be associated with a player, either solely, or in combination with other tokens). For example, a fingerprint reader may not have enough precision to uniquely identify a player, but in combination with an account identification obtained by reading a card or manual input, can be used to ensure that a unique identification is made.

Figure 21:
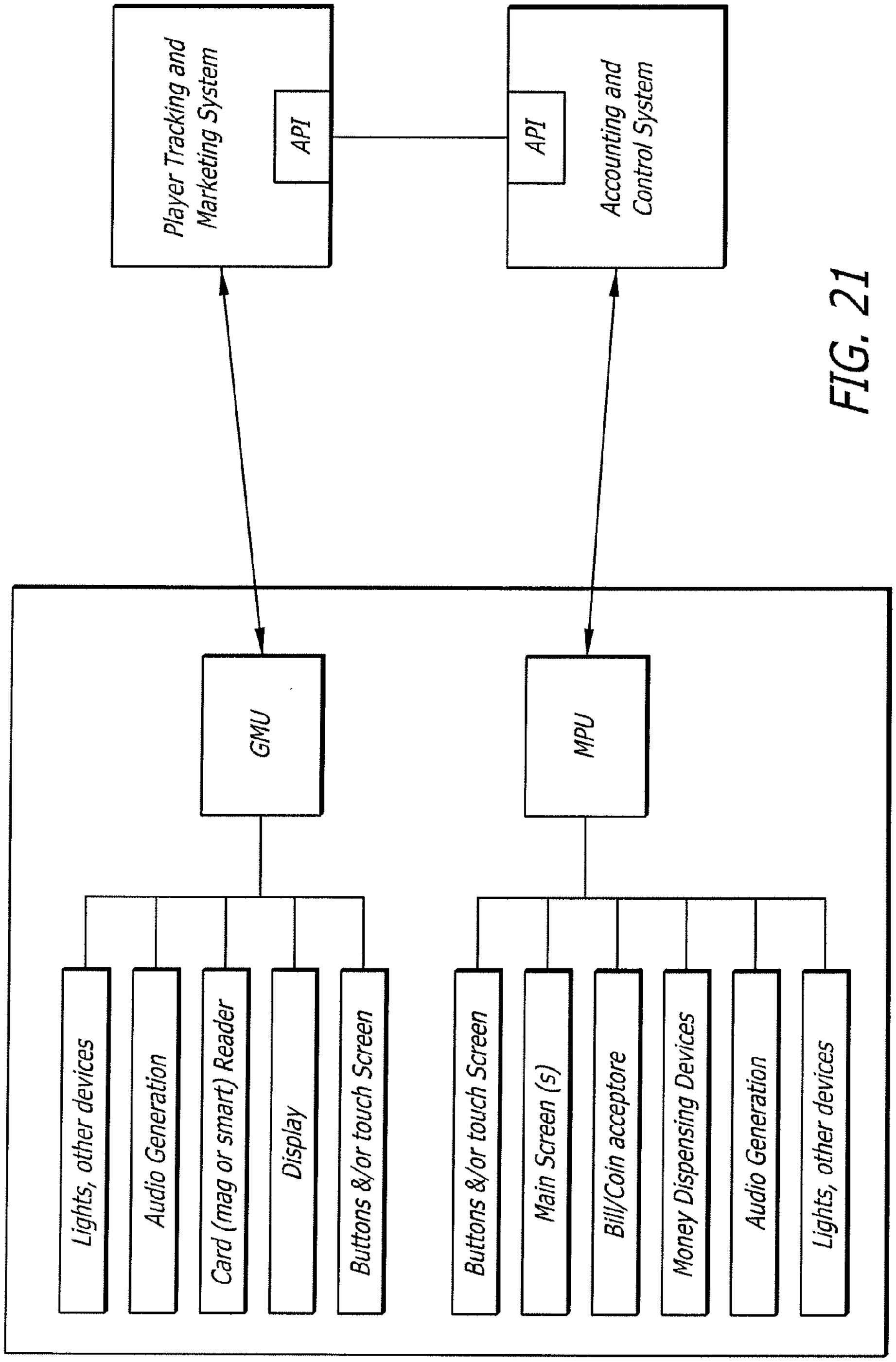
FIG. 21 illustrates the logical independent connections between a game monitoring unit and a player tracking system server, and between a master processing unit and an accounting and control system server, as well as the connection between the accounting and control system server and the player tracking system server via their respective APIs.

Referring now to FIG. 21, in a preferred embodiment, the player tracking transaction begins when a customer inserts a player tracking card, or otherwise identifies himself to the universal game monitoring unit. The universal game monitoring unit formulates a message to a player tracking computer that contains the identification of the player who has identified himself. Typically, this identification is in the form of a number (or string) that uniquely identifies an account. The system validates that this is a known account and accesses an API that enables it to communicate with the accounting and control computer. The accounting and control computer accesses its own data storage and retrieves the game play meters for the gaming device which contains the activated universal game monitoring unit. Game play information is then returned through the API to the player tracking computer, which records initial values for the player's play session. Typically, a message is then returned to the universal game monitoring unit, which provides a greeting message to the player, and confirms that their game play is being tracked.

As the player plays games on the gaming device, the accounting/control computer updates its internal game play information. When the player completes his play session, he indicates to the system that he is concluding his play. Typically, this is done by removing his identification card (or equivalent token), although other means are possible, such as depressing a button. When this occurs, the universal game monitoring unit sends a message to the player tracking computer that provides the player's identification. The player tracking computer again accesses the API to the accounting/control computer and retrieves ending meters for the player's session (or other equivalent data). The player tracking computer then records the player's total play in the player's data record, which may qualify the player for marketing (or other) rewards. This data is then also available to the gaming system operator for use in a wide array of marketing programs.

Although the invention has been described in language specific to computer structural features, methodological acts, and by computer readable media, it is to be understood that the invention defined in the appended claims is not necessarily limited to the specific structures, acts, or media described. Therefore, the specific structural features, acts and mediums are disclosed as exemplary embodiments implementing the invention.

Furthermore, the various embodiments described above are provided by way of illustration only and should not be construed to limit the invention. Those skilled in the art will readily recognize various modifications and changes that may be made to the invention without following the example embodiments and applications illustrated and described herein, and without departing from the true spirit and scope of the invention, which is set forth in the following claims.

What is claimed is:

1. A gaming device-enabled gaming system, the system comprising:

a physical network that enables communication between gaming devices in the gaming device-enabled gaming system;

a system gaming server connected to the physical network that provides a system-based game;

each gaming device comprising:

(i) at least one display device;

(ii) a plurality of input devices including:

(a) an acceptor of a first physical item associated with a first monetary value;

(b) a cashout button actuatable to cause an initiation of a payout associated with a credit balance;

(iii) at least one gaming device processor; and (iv) at least one gaming device memory device storing a plurality of gaming device instructions; and a player tracking server connected to a physical network that communicates gaming data with one or more gaming devices;

an embedded user interface incorporated into each gaming device, each gaming device including a gaming presentation of a base game and a gaming processor for controlling the base game, wherein the gaming processor of the gaming device enables play of the base game without requiring use of the embedded user interface, the embedded user interface comprising:

a player tracking interface including a display screen, wherein the player tracking interface enables display of the system-based game to a user, wherein the player tracking interface enables presentation of information to the user, and wherein the player tracking interface enables reception of information from the user; and an embedded processor, wherein the embedded processor employs an internal operating system and communicates with the gaming processor, wherein the embedded processor controls an outcome of the system-based game of which at least a portion of a system-based game presentation is physically external to the embedded user interface;

wherein the embedded user interface drives visual gaming presentation components of the system-based game of which at least a portion of the visual gaming presentation components are physically external to the display screen.

2. The embedded user interface of claim 1, wherein the portion of the visual gaming presentation components that is physically external to the embedded user interface includes: an additional gaming presentation.

3. The embedded user interface of claim 1, wherein the portion of the visual gaming presentation components that is physically external to the embedded user interface includes: an additional display screen.

4. The embedded user interface of claim 1, wherein the portion of the visual gaming presentation components that is physically external to the embedded user interface includes: a wheel.

5. The embedded user interface of claim 1, wherein the portion of the visual gaming presentation components that is physically external to the embedded user interface includes: one or more reels.

6. The embedded user interface of claim 1, wherein the portion of the visual gaming presentation components that is physically external to the embedded user interface includes: one or more lights.

7. A gaming device-enabled gaming system, the system comprising:

a physical network that enables communication between gaming devices in the gaming device-enabled gaming system;

a system gaming server connected to the physical network that provides a system-based game;

each gaming device comprising:

(i) at least one display device;

(ii) a plurality of input devices including:

(a) an acceptor of a first physical item associated with a first monetary value;

(b) a cashout button actuatable to cause an initiation of a payout associated with a credit balance;

(iii) at least one gaming device processor; and (iv) at least one gaming device memory device storing a plurality of gaming device instructions; and a player tracking server connected to a physical network that communicates gaming data with one or more gaming devices;

an embedded user interface system incorporated into a gaming device, the gaming device including a gaming presentation of a base game and a gaming processor for controlling the base game, wherein the gaming processor of the gaming device enables play of the base game without requiring use of the embedded user interface system, the embedded user interface system comprising:

a player tracking interface including a display screen, wherein the player tracking interface enables display of the system-based game to a user, wherein the player tracking interface enables presentation of information to the user, and wherein the player tracking interface enables reception of information from the user; and an embedded processor, wherein the embedded processor employs an internal operating system and communicates with the gaming processor, wherein the embedded processor controls an outcome of the system-based game of which at least a portion of a system-based game presentation is physically external to the embedded user interface system;

wherein the embedded user interface system drives visual gaming presentation components of the system-based game of which at least a portion of the visual gaming presentation components are physically external to the display screen.

8. The embedded user interface system of claim 7, wherein the portion of the visual gaming presentation components that is physically external to the embedded user interface includes: an additional gaming presentation.

9. The embedded user interface system of claim 7, wherein the portion of the visual gaming presentation components that is physically external to the embedded user interface includes: an additional display screen.

10. The embedded user interface system of claim 7, wherein the portion of the visual gaming presentation components that is physically external to the embedded user interface includes: a wheel.

11. The embedded user interface system of claim 7, wherein the portion of the visual gaming presentation components that is physically external to the embedded user interface includes: one or more reels.

12. The embedded user interface system of claim 7, wherein the portion of the visual gaming presentation components that is physically external to the embedded user interface includes: one or more lights.

13. An embedded user interface system incorporated into a gaming device, the gaming device including a gaming presentation of a base game and a gaming processor for controlling the base game, wherein the gaming processor of the gaming device enables play of the base game without requiring use of the embedded user interface system, the gaming device further comprising:(i) at least one display device; (ii) a plurality of input devices including: (a) an acceptor of a first physical item associated with a first monetary value; (b) a cashout button actuatable to cause an initiation of a payout associated with a credit balance; (iii) at least one gaming device processor; and (iv) at least one gaming device memory device storing a plurality of gaming device instructions, the embedded user interface system comprising:

a player tracking interface including a display screen, wherein the player tracking interface enables display of a system game to a user, wherein the player tracking interface enables presentation of information to the user, and wherein the player tracking interface enables reception of information from the user; and an embedded processor, wherein the embedded processor employs an internal operating system and communicates with the gaming processor, wherein the embedded processor controls an outcome of the system game of which the system game presentation is physically external to the embedded user interface system;

wherein the embedded user interface system drives visual gaming presentation components of the system game of which the visual gaming presentation components are physically external to the display screen.

14. The embedded user interface system of claim 13, wherein the visual gaming presentation components that are physically external to the display screen include:

an additional gaming presentation.

15. The embedded user interface system of claim 13, wherein the portion of the visual gaming presentation components that are physically external to the display screen include: an additional display screen.

16. The embedded user interface system of claim 13, wherein the visual gaming presentation components that are physically external to the display screen include: a wheel.

17. The embedded user interface system of claim 13, wherein the visual gaming presentation components that are physically external to the display screen include:

one or more reels.

18. The embedded user interface system of claim 13, wherein the visual gaming presentation components that are physically external to the display screen include: one or more lights.

19. An embedded user interface system incorporated into a gaming device, the gaming device including a gaming presentation of a base game and a gaming processor for controlling the base game, wherein the gaming processor of the gaming device enables play of the base game without requiring use of the embedded user interface system, the gaming device further comprising:(i) at least one display device; (ii) a plurality of input devices including: (a) an acceptor of a first physical item associated with a first monetary value; (b) a cashout button actuatable to cause an initiation of a payout associated with a credit balance; (iii) at least one gaming device processor; and (iv) at least one gaming device memory device storing a plurality of gaming device instructions, the embedded user interface system comprising:

a player tracking interface including a display screen, wherein the player tracking interface enables display of a system game to a user, wherein the player tracking interface enables presentation of information to the user, and wherein the player tracking interface enables reception of information from the user; and an embedded processor, wherein the embedded processor employs an internal operating system and communicates with the gaming processor, wherein the embedded processor controls an outcome of the system game of which at least a portion of the system game presentation is physically external to the embedded user interface system;

wherein the embedded user interface system drives visual gaming presentation components of the system game presentation that is physically external to the display screen.

20. The embedded user interface system of claim 19, wherein the system game presentation that is physically external to the display screen includes: an additional gaming presentation.

21. The embedded user interface system of claim 19, wherein the system game presentation that is physically external to the display screen includes: an additional display screen.

22. The embedded user interface system of claim 19, wherein the system game presentation that is physically external to the display screen includes: a wheel.

23. The embedded user interface system of claim 19, wherein the system game presentation that is physically external to the display screen includes: one or more reels.

24. The embedded user interface system of claim 19, wherein the system game presentation that is physically external to the display screen includes: one or more lights.

25. A gaming system comprising:

a player tracking system server connected to a network, wherein the player tracking system server includes an application program interface;

an accounting and control system server connected to the network, wherein the player tracking system server includes an application program interface through which communication with the accounting and control system server is enabled via the application program interface of the player tracking system server;

one or more gaming devices connected to the network, wherein each gaming device includes a gaming presentation of a base game and a master processing unit for controlling the base game, and wherein the master processing unit enables communication with the accounting and control system server;

each gaming device comprising:

(i) at least one display device;

(ii) a plurality of input devices including:

(a) an acceptor of a first physical item associated with a first monetary value;

(b) a cashout button actuatable to cause an initiation of a payout associated with a credit balance; and (iii) at least one gaming device memory device storing a plurality of gaming device instructions; and an embedded user interface incorporated into each gaming device, wherein the embedded user interface enables communication with the player tracking system server, each embedded user interface comprising:

a player tracking interface including a display screen, wherein the player tracking interface enables display of a system game to a user, wherein the player tracking interface enables presentation of information to the user, and wherein the player tracking interface enables reception of information from the user; and an embedded processor, wherein the embedded processor employs an internal operating system and communicates with the gaming processor, wherein the embedded processor controls an outcome of the system game of which at least a portion of the system game presentation is physically external to the embedded user interface system;

wherein the embedded user interface drives visual gaming presentation components of the system game of which at least a portion of the visual gaming presentation components are physically external to the embedded user interface.

* * * * *